US011278914B2

(12) United States Patent
Pratt

(10) Patent No.: US 11,278,914 B2
(45) Date of Patent: Mar. 22, 2022

(54) METHOD FOR SORTING SOIL

(71) Applicant: Thomas Pratt, Oyster Bay Cove, NY (US)

(72) Inventor: Thomas Pratt, Oyster Bay Cove, NY (US)

( * ) Notice: Subject to any disclaimer, the term of this patent is extended or adjusted under 35 U.S.C. 154(b) by 0 days.

(21) Appl. No.: 16/927,342

(22) Filed: Jul. 13, 2020

(65) Prior Publication Data

US 2021/0039110 A1     Feb. 11, 2021

Related U.S. Application Data

(63) Continuation of application No. 16/518,332, filed on Jul. 22, 2019, now Pat. No. 10,710,097, which is a continuation of application No. 15/987,045, filed on May 23, 2018, now Pat. No. 10,357,779.

(60) Provisional application No. 62/510,901, filed on May 25, 2017.

(51) Int. Cl.
| *B03B 9/00* | (2006.01) |
| *B03B 5/04* | (2006.01) |
| *B09C 1/02* | (2006.01) |
| *B09C 1/00* | (2006.01) |

(52) U.S. Cl.
CPC .................. *B03B 9/00* (2013.01); *B03B 5/04* (2013.01); *B09C 1/00* (2013.01); *B09C 1/02* (2013.01)

(58) Field of Classification Search
CPC ................ B09C 1/02; B03B 5/04; B03B 9/00
USPC .......................................................... 209/10
See application file for complete search history.

(56) References Cited

U.S. PATENT DOCUMENTS

| 4,100,059 | A |   | 7/1978  | Jinno |
| 4,585,547 | A | * | 4/1986  | Nicholson ............... B03B 5/60 |
|           |   |   |         | 209/156 |
| 4,678,558 | A |   | 7/1987  | Belluteau et al. |
| 5,205,674 | A |   | 4/1993  | Chisholm et al. |
| 5,242,246 | A |   | 9/1993  | Manchak, III et al. |
| 5,344,255 | A |   | 9/1994  | Toor |
| 5,593,600 | A |   | 1/1997  | Solomon |
| 6,102,613 | A |   | 8/2000  | Medico, Jr. et al. |
| 6,929,395 | B1 |   | 8/2005  | Metz |
| 7,244,361 | B2 |   | 7/2007  | Dwyer |
| 8,322,639 | B2 |   | 12/2012 | Gitschel |
| 8,499,832 | B2 |   | 8/2013  | Crews et al. |
| 9,068,133 | B2 |   | 6/2015  | Petry |
| 2007/0108105 | A1 | * | 5/2007 | Burnett ............... B01D 21/283 |
|           |   |   |         | 209/17 |
| 2008/0078699 | A1 | * | 4/2008 | Carr ..................... B01D 33/72 |
|           |   |   |         | 209/233 |
| 2011/0272362 | A1 |   | 11/2011 | Sikes et al. |

(Continued)

FOREIGN PATENT DOCUMENTS

CA          2995628 A1 *   8/2018   ........... E21B 21/065

*Primary Examiner* — Terrell H Matthews
(74) *Attorney, Agent, or Firm* — Carter, DeLuca & Farrell LLP

(57) ABSTRACT

A sorting station is provided with a deck screener including at least one filter and a fluid source configured to supply a fluid; a chute in fluid communication with the deck screener; a drying station in fluid communication with the chute; a settler in fluid communication with the drying station and the chute; and wherein the fluid is configured to wash matter disposed onto the deck screener. Methods of sorting a particular matter from a mixture of matters, and processes of filtering soil are also provided.

10 Claims, 29 Drawing Sheets

(56) References Cited

U.S. PATENT DOCUMENTS

| | | | |
|---|---|---|---|
| 2013/0037450 A1* | 2/2013 | Schirm | B07B 1/28 |
| | | | 209/233 |
| 2013/0269735 A1 | 10/2013 | Roetzel et al. | |
| 2015/0224540 A1 | 8/2015 | Robinson | |
| 2016/0144377 A1* | 5/2016 | Lomond | E21B 21/065 |
| | | | 209/17 |
| 2016/0228919 A1* | 8/2016 | Vallelly | B07B 9/02 |
| 2017/0361332 A1* | 12/2017 | Bennington | B04B 5/02 |
| 2018/0162760 A1 | 6/2018 | Donais et al. | |
| 2018/0339299 A1 | 11/2018 | Pratt | |
| 2021/0086156 A1* | 3/2021 | Esson | C10G 31/06 |

\* cited by examiner

| Table 1 | | | | | | | |
|---|---|---|---|---|---|---|---|
| VOC | CasNo | Analyte | Units | Limits | | | Q |
| | 630-20-6 | 1,1,1,2-Tetrachloroethane | PPB | NA | (14) | 1 | U |
| | 71-55-6 | 1,1,1,-Trichloroethane | PPB | 680 | (14) | 1 | U |
| | 79-34-5 | 1,1,2,2-Tetrachloroethane | PPB | NA | (14) | 1 | U |
| | 79-34-5 | 1,1,2,2-Tetrachloroethane | PPB | NA | (14) | 1 | U |
| | 79-34-5 | 1,1,2,2-Tetrachloroethane | PPB | NA | (14) | 1 | U |
| | 75-34-3 | 1,1-Dichloroethane | PPB | 270 | (14) | 1 | U |
| | 75-35-4 | 1,1-Dichloroethene | PPB | 330 | (14) | 1 | U |
| | 563-58-6 | 1,1-Dichloropropene | PPB | NA | (14) | 1 | U |
| | 87-61-6 | 1,2,3-Trichlorobenzene | PPB | NA | (14) | 1 | U |
| | 96-18-4 | 1,2,3-Trichloropropane | PPB | NA | (14) | 1 | U |
| | 95-93-2 | 1,2,3,4,5-Tetramethylbenzene | PPB | NA | (14) | 1 | U |
| | 120-82-1 | 1,1,2,4-Trichlorobenzene | PPB | NA | (14) | 1 | U |
| | 95-63-6 | 1,1,2,4-Trimethylbenzene | PPB | 3600 | (14) | 1 | U |
| | 96-12-8 | 1,2-Dibromo-3-chloropropane | PPB | NA | (14) | 1 | U |
| | 106-93-4 | 1,2-Dibromoethane | PPB | NA | (14) | 1 | U |
| | 95-50-1 | 1,2-Dichlorobenzene | PPB | 1100 | (14) | 1 | U |
| | 107-06-2 | 1,2-Dichloroethane | PPB | 20 | (14) | 1 | U |
| | 78-87-5 | 1,2-Dichloropropane | PPB | NA | (14) | 1 | U |
| | 108-67-8 | 1,3,5-Trimethylbenzene | PPB | 8400 | (14) | 1 | U |
| | 541-73-1 | 1,3-Dichlorobenzene | PPB | 2400 | (14) | 1 | U |
| | 142-28-9 | 1,3-dichloropropane | PPB | NA | (14) | 1 | U |
| | 106-46-7 | 1,4-Dichlorobenzene | PPB | 1800 | (14) | 1 | U |
| | 123-91-1 | 1,4-Dioxane | PPB | 100 | (14) | 1 | U |
| | 594-20-7 | 2,2-Dichloropropane | PPB | NA | (14) | 1 | U |
| | 78-93-3 | 2-Butanone | PPB | 120 | (14) | 5.2 | U |
| | 110-75-8 | 2-Chloroethyl vinyl ether | PPB | NA | (14) | 1 | U |
| | 95-49-8 | 2-Chlorotoluene | PPB | NA | (14) | 1 | U |
| | 591-78-6 | 2-Hexanone | PPB | NA | (14) | 5.2 | U |
| | 67-63-0 | 2-Propanol | PPB | NA | (14) | 1 | U |
| | 106-43-4 | 4-Chlorotoluene | PPB | NA | (14) | 1 | U |
| | 99-87-6 | 4-Isopropyltoluene | PPB | NA | (14) | 1 | U |
| | 108-10-1 | 4-Methyl-2-pentanone | PPB | NA | (14) | 5.2 | U |
| | 67-64-1 | Acetone | PPB | 50 | (14) | 5.2 | U |
| | 107-02-8 | Acrolein | PPB | NA | (14) | 13 | U |
| | 107-13-1 | Acrylonitrile | PPB | NA | (14) | 1 | U |
| | 71-43-2 | Benzene | PPB | 60 | (14) | 1 | U |
| | 108-86-1 | Bromobenzene | PPB | NA | (14) | 1 | U |
| | 74-97-5 | Bromochloromethane | PPB | NA | (14) | 1 | U |
| | 75-27-4 | Bromodichloromethane | PPB | NA | (14) | 1 | U |
| | 75-25-2 | Bromoform | PPB | NA | (14) | 1 | U |

FIG.14a

| | 74-83-9 | Bromomethane | PPB | | NA | (14) | 1 | U |
|---|---|---|---|---|---|---|---|---|
| | 75-15-0 | Carbon disulfide | PPB | | NA | (14) | 1 | U |
| | 56-23-5 | Carbon tetrachloride | PPB | | 760 | (14) | 1 | U |
| | 108-90-7 | Chlorobenzene | PPB | | 1100 | (14) | 1 | U |
| | 75-45-6 | Chlorodifluoromethane | PPB | | NA | (14) | 1 | U |
| | 75-00-3 | Chloroethane | PPB | | NA | (14) | 1 | U |
| | 67-66-3 | Chloroform | PPB | | 370 | (14) | 1 | U |
| | 74-87-3 | Chloromethane | PPB | | NA | (14) | 1 | U |
| | 156-59-2 | cis-1,2-Dichloroethene | PPB | | 250 | (14) | 1 | U |
| | 10061-01-5 | cis-1,3-Dichloropropene | PPB | | NA | (14) | 1 | U |
| | 110-82-7 | Cyclohexame | PPB | | NA | (14) | 2.1 | U |
| | 124-48-1 | Dibromochloromethane | PPB | | NA | (14) | 1 | U |
| | 74-95-3 | Dibromomethane | PPB | | NA | (14) | 1 | U |
| | 75-71-8 | Dichlorodifluoromethane | PPB | | NA | (14) | 1 | U |
| | 108-20-3 | Diisopropyl ether | PPB | | NA | (14) | 1 | U |
| | 64-17-5 | Ethanol | PPB | | NA | (14) | 10 | U |
| | 100-41-4 | Ethylbenzene | PPB | | 1000 | (14) | 1 | U |
| | 76-14-2 | Freon-114 | PPB | | NA | (14) | 1 | U |
| | 87-68-3 | Hexachlorobutadiene | PPB | | NA | (14) | 1 | U |
| | 98-82-8 | Isopropylbenzene | PPB | | NA | (14) | 1 | U |
| | 179601-23-1 | m,p-Xylene | PPB | | 260 | (14) | 2.1 | U |
| | 79-20-9 | Methyl Acetate | PPB | | NA | (14) | 1 | U |
| | 1634-04-4 | Methyl tert-butyl ether | PPB | | 930 | (14) | 1 | U |
| | 75-09-2 | Methylene chloride | PPB | | 50 | (14) | 6.8 | B |
| | 91-20-3 | Naphthalene | PPB | | NA | (14) | 1 | U |
| | 104-51-8 | n-Butylbenzene | PPB | | 12000 | (14) | 1 | U |
| | 103-65-1 | n-Propylbenzene | PPB | | 3900 | (14) | 1 | U |
| | 95-47-6 | o-Xylene | PPB | | 260 | (14) | 1 | U |
| | 105-05-5 | p-Diethylbenzene | PPB | | NA | (14) | 1 | U |
| | 622-96-8 | p-Ethyltoluene | PPB | | NA | (14) | 1 | U |
| | 135-98-8 | sec-Butylbenze | PPB | | 11000 | (14) | 1 | U |
| | 100-42-5 | Styrene | PPB | | NA | (14) | 1 | U |
| | 75-65-0 | St-Butyl alcohol | PPB | | NA | (14) | 2.6 | U |
| | 98-06-6 | tert-Butylbenzene | PPB | | 5900 | (14) | 1 | U |
| | 127-18-4 | Tetrachloroethene | PPB | | 1300 | (14) | 1 | U |
| | 108-88-3 | Toluene | PPB | | 700 | (14) | 1 | U |
| | 156-60-5 | trans-1,2-Dichloroethene | PPB | | 190 | (14) | 1 | U |
| | 10061-02-6 | trans-1,3-Dichloropropene | PPB | | NA | (14) | 1 | U |
| | 79-01-6 | Trichloroethene | PPB | | 470 | (14) | 1 | U |
| | 75-69-4 | Trichlorofluoromethane | PPB | | NA | (14) | 1 | U |
| | 108-05-4 | Vinyl acetate | PPB | | NA | (14) | 1 | U |
| | 75-01-4 | Vinyl chloride | PPB | | 20 | (14) | 1 | U |
| | 1330-20-7 | Xylenes, Total | PPB | | 260 | (14) | 3.1 | U |
| SVOC | | | | | | | | |
| | 120-82-1 | 1,2,4-Trichlorobenzene | PPB | | NA | (14) | 27 | U |
| | 95-50-1 | 1,2-Dichlorobenzene | PPB | | 1100 | (14) | 27 | U |

FIG.14b

| | 541-73-1 | 1,3-Dichlorobenzene | PPB | 2400 | (14) | 27 | U |
|---|---|---|---|---|---|---|---|
| | 106-46-7 | 1,4-Dichlorobenze | PPB | 1800 | (14) | 27 | U |
| | 95-95-4 | 2,4,5-Trichlorophenol | PPB | NA | (14) | 27 | U |
| | 88-06-2 | 2,4,6-Trichlorophenol | PPB | NA | (14) | 27 | U |
| | 120-83-2 | 2,4-Dichlorophenol | PPB | NA | (14) | 27 | U |
| | 105-67-9 | 2,4-Dimethylphenol | PPB | NA | (14) | 27 | U |
| | 51-28-5 | 2,4-Dinitrophenol | PPB | NA | (14) | 53 | U |
| | 121-14-2 | 2,4-Dinitrotoluene | PPB | NA | (14) | 27 | U |
| | 606-20-2 | 2,6-Dinitrotoluene | PPB | NA | (14) | 53 | U |
| | 91-58-7 | 2-Chloronaphthalene | PPB | NA | (14) | 27 | U |
| | 95-57-8 | 2-Chlorophenol | PPB | NA | (14) | 27 | U |
| | 91-57-6 | 2-Methylnaphthalena | PPB | NA | (14) | 27 | U |
| | 95-48-7 | 2-Methylphenol | PPB | 330 | (14) | 27 | U |
| | 88-74-4 | 2-Nitroaniline | PPB | NA | (14) | 27 | U |
| | 88-75-5 | 2-Nitrophenol | PPB | NA | (14) | 53 | U |
| | 91-94-1 | 3,3'-Dichlorobenzidine | PPB | NA | (14) | 27 | U |
| 108-39--4/106-44 | | 3+4-Methylphenol | PPB | 330 | (14) | 27 | U |
| | 99-092-2 | 3-Nitroaniline | PPB | NA | (14) | 27 | U |
| | 534-52-1 | 4,6-Dinitro-2-methylphenol | PPB | NA | (14) | 53 | U |
| | 101-55-3 | 4-Bromophenyl pheny ether | PPB | NA | (14) | 27 | U |
| | 59-50-7 | 4-Chloro-3-methylphenol | PPB | NA | (14) | 27 | U |
| | 106-47-8 | 4-Chloroaniline | PPB | NA | (14) | 27 | U |
| | 7005-72-3 | 4-Chlorpheny phenyl ether | PPB | NA | (14) | 27 | U |
| | 100-01-6 | 4-Nitroaniline | PPB | NA | (14) | 27 | B |
| | 100-02-7 | 4-Nitrophenol | PPB | NA | (14) | 53 | U |
| | 83-32-9 | Acenaphthene | PPB | 20000 | (14) | 27 | U |
| | 208-96-8 | Acenaphthylene | PPB | 100000 | (14) | 27 | U |
| | 98-86-2 | Acetophenone | PPB | NA | (14) | 27 | U |
| | 62-53-3 | Aniline | PPB | NA | (14) | 27 | U |
| | 120-12-7 | Anthracene | PPB | 100000 | (14) | 27 | U |
| | 1912-24-9 | Atrazine | PPB | NA | (14) | 27 | U |
| | 103-33-3 | Azobenzene | PPB | NA | (14) | 27 | U |
| | 100-52-7 | Benzaldehyde | PPB | NA | (14) | 53 | U |
| | 92-87-5 | Benzidine | PPB | NA | (14) | 53 | U |
| | 56-55-3 | Benzo(a) anthracene | PPB | 1000 | (14) | 46 | U |
| | 50-32-8 | Benzo(a)pyrene | PPB | 1000 | (14) | 44 | U |
| | 205-99-2 | Benzo(b)fluoranthene | PPB | 1000 | (14) | 49 | U |
| | 191-24-2 | Benzo(g,h,i) perylene | PPB | 100000 | (14) | 40 | U |
| | 207-08-9 | Benzo(k)fluoranthene | PPB | 800 | (14) | 47 | U |
| | 65-85-0 | Benzoic acid | PPB | NA | (14) | 53 | U |
| | 100-51-6 | Benzyl alcohol | PPB | NA | (14) | 27 | U |
| | 92-52-4 | Biphenyl | PPB | NA | (14) | 27 | U |
| | 111-91-1 | Bis(2-chloroethoxy)methane | PPB | NA | (14) | 27 | U |
| | 111-44-4 | Bis(2-chloroethyl)ether | PPB | NA | (14) | 27 | U |
| | 108-60-1 | Bis(2-chloroisopropyl)ether | PPB | NA | (14) | 27 | U |
| | | Bis(2-ethylhexyl)phthalate | PPB | NA | (14) | 27 | U |

FIG.14c

|   | 85-68-7 | Butyl benzyl phthalate | PPB | NA | (14) | 27 | U |
|---|---|---|---|---|---|---|---|
|   | 105-60-2 | Caprolactam | PPB | NA | (14) | 27 | U |
|   | 86-74-8 | Carbazole | PPB | NA | (14) | 27 | U |
|   | 2-18-01 | Chrysene | PPB | 1000 | (14) | 61 | U |
|   | 53-70-3 | Dibenzo(a,h)anthracene | PPB | 330 | (14) | 27 | U |
|   | 32-64-9 | Dibenzofuran | PPB | 7000 | (14) | 27 | U |
|   | 84-66-2 | Diethyl phthalate | PPB | NA | (14) | 27 | U |
|   | 131-11-3 | Dimethyl phthalate | PPB | NA | (14) | 27 | U |
|   | 84-74-2 | Di-n-butyl phthalate | PPB | NA | (14) | 27 | U |
|   | 117-84-0 | Di-n-octyl phthalate | PPB | NA | (14) | 53 | U |
|   | 206-44-0 | Fluoranthene | PPB | 100000 | (14) | 95 | U |
|   | 86-73-7 | Fluorene | PPB | 30000 | (14) | 27 | U |
|   | 118-74-1 | Hexachlorobenzene | PPB | 330 | (14) | 27 | U |
|   | 87-68-3 | Hexachlorobutadiene | PPB | NA | (14) | 27 | U |
|   | 77-47-4 | Hexachlorocyclopentadiene | PPB | NA | (14) | 53 | U |
|   | 67-72-1 | Hexachloroethane | PPB | NA | (14) | 27 | U |
|   | 193-39-5 | Indeno(1,2,3-c,d)pyrene | PPB | 500 | (14) | 39 | U |
|   | 78-59-1 | Isophorone | PPB | NA | (14) | 27 | U |
|   | 91-20-3 | Naphthalene | PPB | 12000 | (14) | 27 | U |
|   | 98-95-3 | Nitrobenzene | PPB | NA | (14) | 27 | U |
|   | 62-75-9 | N-Nitrosodimethylamine | PPB | NA | (14) | 27 | U |
|   | 621-64-7 | N-Nitrosodi-n-propylamine | PPB | NA | (14) | 27 | U |
|   | 86-30-6 | N-Nitrosodiphenylamine | PPB | NA | (14) | 27 | U |
|   | 56-38-2 | Parathion | PPB | NA | (14) | 53 | B |
|   | 87-86-5 | Pentachlorophenol | PPB | 800 | (14) | 53 | U |
|   | 85-01-8 | Phenanthrene | PPB | 10000 | (14) | 35 | U |
|   | 108-95-2 | Phenol | PPB | 330 | (14) | 27 | U |
|   | 129-00-0 | Pyrene | PPB | 100000 | (14) | 91 | U |
|   | 110-86-1 | Pyridine | PPB | NA | (14) | 27 | U |
| HERBICIDES |   |   |   |   |   |   |   |
|   | 93-76-5 | 2,4,5-T | PPB | NA | (14) | 1.1 | U |
|   | 93-72-1 | 2,4,5-TP | PPB | 3800 | (14) | 1.1 | U |
|   | 94-75-7 | 2,4-D | PPB | NA | (14) | 1.1 | U |
|   | 1918-00-9 | Dicamba | PPB | NA | (14) | 1.1 | U |
| PESTICIDES |   |   |   |   |   |   |   |
|   | 72-54-8 | 4,4'-DDD | PPB | 3.3 | (14) | 1.3 | U |
|   | 72-55-9 | 4,4'-DDE | PPB | 3.3 | (14) | 6.9 | U |
|   | 50-29-3 | 4,4'-DDT | PPB | 3.3 | (14) | 2.5 | U |
|   | 309-00-2 | Aldrin | PPB | 5 | (14) | 1 | U |
|   | 319-84-6 | alpha-BHC | PPB | 20 | (14) | 1 | U |
|   | 103-71-9 | alpha-Chlordane | PPB | 94 | (14) | 12 | U |
|   | 319-85-7 | beta-BHC | PPB | 36 | (14) | 1 | U |
|   | 510-15-6 | Chlorobenzilate | PPB | NA | (14) | 1 | U |
|   | 96-12-8 | DBCP | PPB | NA | (14) | 1 | U |
|   | 319-86-8 | delta-BHC | PPB | 40 | (14) | 1 | U |
|   | 60-57-1 | Dieldrin | PPB | 5 | (14) | 1 | U |

FIG.14d

|  | 959-98-8 | Endosulfan I | PPB | 2400 | (14) | 1 | U |
|---|---|---|---|---|---|---|---|
|  | 33213-65-9 | Endosulfan II | PPB | 2400 | (14) | 1 | U |
|  | 1031-07-8 | Endosulfan II sulfate | PPB | 2400 | (14) | 1 | U |
|  | 72-20-8 | Endrin | PPB | 14 | (14) | 1 | U |
|  | 7421-93-4 | Endrin aldehyde | PPB | NA | (14) | 1 | U |
|  | 53494-70-5 | Endrin ketone | PPB | NA | (14) | 1 | U |
|  | 58-89-9 | gamma-BHC | PPB | 100 | (14) | 1 | U |
|  | 5566-34-7 | gamma-Chlordane | PPB | NA | (14) | 8.7 | J |
|  | 56-44-8 | Heptachlor | PPB | 42 | (14) | 2.1 | U |
|  | 1024-57-3 | Heptachlor epoxide | PPB | NA | (14) | 7.4 | P |
|  | 118-74-1 | Hexachlorobenzene | PPB | 330 | (14) | 1 | U |
|  | 77-47-4 | Hexachlorocyclopentadiene | PPB | NA | (14) | 3.1 | U |
|  | 72-43-5 | Methoxychlor | PPB | NA | (14) | 2.8 | P |
|  | 8001-35-2 | Hexachlorobutadiene | PPB | NA | (14) | 13 | U |
| PCBS |  |  |  |  |  |  |  |
|  | 12674-11-2 | Aroclor 1016 | PPB | 100 | (14) | 10 | U |
|  | 11104-28-2 | Aroclor 1221 | PPB | 100 | (14) | 10 | U |
|  | 11141-61-5 | Aroclor 1232 | PPB | 100 | (14) | 10 | U |
|  | 53469-21-9 | Aroclor 1242 | PPB | 100 | (14) | 10 | U |
|  | 12672-28-6 | Aroclor 1248 | PPB | 100 | (14) | 10 | U |
|  | 11097-69-1 | Aroclor 1254 | PPB | 100 | (14) | 10 | U |
|  | 11096-82-5 | Aroclor 1260 | PPB | 100 | (14) | 10 | U |
|  | 37324-23-5 | Aroclor 1262 | PPB | 100 | (14) | 10 | U |
|  | 11100-14-4 | Aroclor 1268 | PPB | 100 | (14) | 10 | U |
| METALS |  |  |  |  |  |  |  |
|  | 7429-90-5 | Aluminum | PPM | NA | (14) | 2320 |  |
|  | 7440-36-0 | Antimony | PPM | NA | (14) | 0.21 | U |
|  | 7440-38-2 | Arsenic | PPM | 13 | (14) | 2.63 |  |
|  | 7440-39-3 | Barium | PPM | 350 | (14) | 7.95 |  |
|  | 7440-41-7 | Beryllium | PPM | 7.2 | (14) | 0.105 | U |
|  | 7440-43-9' | Cadmium | PPM | 2.5 | (14) | 0.105 | U |
|  | 7440-70-2' | Calcium | PPM | NA | (14) | 1120 |  |
|  | 7440-47-3' | Chromium | PPM | NA | (14) | 3.18 |  |
|  | 7440-48-4 | Cobalt | PPM | NA | (14) | 0.105 | U |
|  | 7440-50-8 | Copper | PPM | 50 | (14) | 3.41 |  |
|  | 7439-89-6 | Iron | PPM | NA | (14) | 3210 |  |
|  | 7439-92-1 | Lead | PPM | 63 | (14) | 5.03 |  |
|  | 7439-95-4 | Magnesium | PPM | NA | (14) | 454 |  |
|  | 7439-96-5 | Manganese | PPM | 1600 | (14) | 66.5 |  |
|  | 7439-97-6 | Mercury | PPM | 0.18 | (14) | 0.0468 |  |
|  | 7440-02-0 | Nickel | PPM | 30 | (14) | 2.48 |  |
|  | 7440-09-7 | Potassium | PPM | NA | (14) | 214 |  |
|  | 7782-49-2 | Selenium | PPM | 3.9 | (14) | 0.21 | U |
|  | 7440-22-1 | Silver | PPM | 2 | (14) | 0.105 | U |
|  | 7440-23-5 | Sodium | PPM | NA | (14) | 23.7 |  |
|  | 7440-28-0 | Thallium | PPM | NA | (14) | 0.315 | U |

FIG.14e

| | 7440-62-2 | Vanadium | PPM | NA | (14) | 5.42 | |
|---|---|---|---|---|---|---|---|
| | 7440-62-6 | Zinc | PPM | 109 | (14) | 10.7 | |
| WET CHEMISTRARY | | | | | | | |
| | 72-20-8 | Chromium, Hexavalent | PPM | 1 | (14) | 0.261 | U |
| | 7421-93-4 | Chromium, Trivalent | PPM | 30 | (14) | 3.18 | |
| | 53494-70-5 | Cyanide Total & Amenable | PPM | 27 | (14) | 0.0531 | U |
| | 58-89-9 | Percent Moisture | wt% | NA | (14) | 5.83 | |

FIG.14f

| Table 2 | | | | | | | |
|---|---|---|---|---|---|---|---|
| VOC | CasNo | Analyte | Units | Limits | | | Q |
| | 630-20-6 | 1,1,1,2-Tetrachloroethane | PPB | NA | (14) | 1.2 | U |
| | 71-55-6 | 1,1,1,-Trichloroethane | PPB | 680 | (14) | 1.2 | U |
| | 79-34-5 | 1,1,2,2-Tetrachloroethane | PPB | NA | (14) | 1.2 | U |
| | 79-34-5 | 1,1,2,2-Tetrachloroethane | PPB | NA | (14) | 1.2 | U |
| | 79-34-5 | 1,1,2,2-Tetrachloroethane | PPB | NA | (14) | 1.2 | U |
| | 75-34-3 | 1,1-Dichloroethane | PPB | 270 | (14) | 1.2 | U |
| | 75-35-4 | 1,1-Dichloroethene | PPB | 330 | (14) | 1.2 | U |
| | 563-58-6 | 1,1-Dichloropropene | PPB | NA | (14) | 1.2 | U |
| | 87-61-6 | 1,2,3-Trichlorobenzene | PPB | NA | (14) | 1.2 | U |
| | 96-18-4 | 1,2,3-Trichloropropane | PPB | NA | (14) | 1.2 | U |
| | 95-93-2 | 1,2,3,4,5-Tetramethylbenzene | PPB | NA | (14) | 1.2 | U |
| | 120-82-1 | 1,1,2,4-Trichlorobenzene | PPB | NA | (14) | 1.2 | U |
| | 95-63-6 | 1,1,2,4-Trimethylbenzene | PPB | 3600 | (14) | 1.2 | U |
| | 96-12-8 | 1,2-Dibromo-3-chloropropane | PPB | NA | (14) | 1.2 | U |
| | 106-93-4 | 1,2-Dibromoethane | PPB | NA | (14) | 1.2 | U |
| | 95-50-1 | 1,2-Dichlorobenzene | PPB | 1100 | (14) | 1.2 | U |
| | 107-06-2 | 1,2-Dichloroethane | PPB | 20 | (14) | 1.2 | U |
| | 78-87-5 | 1,2-Dichloropropane | PPB | NA | (14) | 1.2 | U |
| | 108-67-8 | 1,3,5-Trimethylbenzene | PPB | 8400 | (14) | 1.2 | U |
| | 541-73-1 | 1,3-Dichlorobenzene | PPB | 2400 | (14) | 1.2 | U |
| | 142-28-9 | 1,3-dichloropropane | PPB | NA | (14) | 1.2 | U |
| | 106-46-7 | 1,4-Dichlorobenzene | PPB | 1800 | (14) | 1.2 | B |
| | 123-91-1 | 1,4-Dioxane | PPB | 100 | (14) | 1.2 | U |
| | 594-20-7 | 2,2-Dichloropropane | PPB | NA | (14) | 1.2 | U |
| | 78-93-3 | 2-Butanone | PPB | 120 | (14) | 6.2 | U |
| | 110-75-8 | 2-Chloroethyl vinyl ether | PPB | NA | (14) | 1.2 | U |
| | 95-49-8 | 2-Chlorotoluene | PPB | NA | (14) | 1.2 | U |
| | 591-78-6 | 2-Hexanone | PPB | NA | (14) | 6.2 | U |
| | 67-63-0 | 2-Propanol | PPB | NA | (14) | 1.2 | U |
| | 106-43-4 | 4-Chlorotoluene | PPB | NA | (14) | 1.2 | U |
| | 99-87-6 | 4-Isopropyltoluene | PPB | NA | (14) | 6.2 | U |
| | 108-10-1 | 4-Methyl-2-pentanone | PPB | NA | (14) | 8.7 | U |
| | 67-64-1 | Acetone | PPB | 50 | (14) | 15 | U |
| | 107-02-8 | Acrolein | PPB | NA | (14) | 1.2 | U |
| | 107-13-1 | Acrylonitrile | PPB | NA | (14) | 1.2 | U |
| | 71-43-2 | Benzene | PPB | 60 | (14) | 1.2 | U |
| | 108-86-1 | Bromobenzene | PPB | NA | (14) | 1.2 | U |
| | 74-97-5 | Bromochloromethane | PPB | NA | (14) | 1.2 | U |
| | 75-27-4 | Bromodichloromethane | PPB | NA | (14) | 1.2 | U |
| | 75-25-2 | Bromoform | PPB | NA | (14) | 1.2 | U |

FIG.15a

| | | | | | | | |
|---|---|---|---|---|---|---|---|
| | 74-83-9 | Bromomethane | PPB | NA | (14) | 1.2 | U |
| | 75-15-0 | Carbon disulfide | PPB | NA | (14) | 1.2 | U |
| | 56-23-5 | Carbon tetrachloride | PPB | 760 | (14) | 1.2 | U |
| | 108-90-7 | Chlorobenzene | PPB | 1100 | (14) | 1.2 | U |
| | 75-45-6 | Chlorodifluoromethane | PPB | NA | (14) | 1.2 | U |
| | 75-00-3 | Chloroethane | PPB | NA | (14) | 1.2 | U |
| | 67-66-3 | Chloroform | PPB | 370 | (14) | 1.2 | U |
| | 74-87-3 | Chloromethane | PPB | NA | (14) | 1.2 | U |
| | 156-59-2 | cis-1,2-Dichloroethene | PPB | 250 | (14) | 1.2 | U |
| | 10061-01-5 | cis-1,3-Dichloropropene | PPB | NA | (14) | 1.2 | U |
| | 110-82-7 | Cyclohexame | PPB | NA | (14) | 2.5 | U |
| | 124-48-1 | Dibromochloromethane | PPB | NA | (14) | 1.2 | U |
| | 74-95-3 | Dibromomethane | PPB | NA | (14) | 1.2 | U |
| | 75-71-8 | Dichlorodifluoromethane | PPB | NA | (14) | 1.2 | U |
| | 108-20-3 | Diisopropyl ether | PPB | NA | (14) | 1.2 | U |
| | 64-17-5 | Ethanol | PPB | NA | (14) | 12 | U |
| | 100-41-4 | Ethylbenzene | PPB | 1000 | (14) | 1.2 | U |
| | 76-14-2 | Freon-114 | PPB | NA | (14) | 1.2 | U |
| | 87-68-3 | Hexachlorobutadiene | PPB | NA | (14) | 1.2 | U |
| | 98-82-8 | Isopropylbenzene | PPB | NA | (14) | 1.2 | U |
| | 179601-23-1 | m,p-Xylene | PPB | 260 | (14) | 2.5 | U |
| | 79-20-9 | Methyl Acetate | PPB | NA | (14) | 1.2 | U |
| | 1634-04-4 | Methyl tert-butyl ether | PPB | 930 | (14) | 1.2 | U |
| | 75-09-2 | Methylene chloride | PPB | 50 | (14) | 7.2 | B |
| | 91-20-3 | Naphthalene | PPB | NA | (14) | 1.2 | U |
| | 104-51-8 | n-Butylbenzene | PPB | 12000 | (14) | 1.2 | U |
| | 103-65-1 | n-Propylbenzene | PPB | 3900 | (14) | 1.2 | U |
| | 95-47-6 | o-Xylene | PPB | 260 | (14) | 1.2 | U |
| | 105-05-5 | p-Diethylbenzene | PPB | NA | (14) | 1.2 | U |
| | 622-96-8 | p-Ethyltoluene | PPB | NA | (14) | 1.2 | U |
| | 135-98-8 | sec-Butylbenze | PPB | 11000 | (14) | 1.2 | U |
| | 100-42-5 | Styrene | PPB | NA | (14) | 1.2 | U |
| | 75-65-0 | St-Butyl alcohol | PPB | NA | (14) | 3.1 | U |
| | 98-06-6 | tert-Butylbenzene | PPB | 5900 | (14) | 1.2 | U |
| | 127-18-4 | Tetrachloroethene | PPB | 1300 | (14) | 1.2 | U |
| | 108-88-3 | Toluene | PPB | 700 | (14) | 1.2 | U |
| | 156-60-5 | trans-1,2-Dichloroethene | PPB | 190 | (14) | 1.2 | U |
| | 10061-02-6 | trans-1,3-Dichloropropene | PPB | NA | (14) | 1.2 | U |
| | 79-01-6 | Trichloroethene | PPB | 470 | (14) | 1.2 | U |
| | 75-69-4 | Trichlorofluoromethane | PPB | NA | (14) | 1.2 | U |
| | 108-05-4 | Vinyl acetate | PPB | NA | (14) | 1.2 | U |
| | 75-01-4 | Vinyl chloride | PPB | 20 | (14) | 1.2 | U |
| | 1330-20-7 | Xylenes, Total | PPB | 260 | (14) | 3.7 | U |
| SVOC | | | | | | | |
| | 120-82-1 | 1,2,4-Trichlorobenzene | PPB | NA | (14) | 31 | U |
| | 95-50-1 | 1,2-Dichlorobenzene | PPB | 1100 | (14) | 31 | U |

FIG.15b

| | | | | | | | |
|---|---|---|---|---|---|---|---|
| | 541-73-1 | 1,3-Dichlorobenzene | PPB | | 2400 | (14) | 31 | U |
| | 106-46-7 | 1,4-Dichlorobenze | PPB | | 1800 | (14) | 31 | U |
| | 95-95-4 | 2,4,5-Trichlorophenol | PPB | | NA | (14) | 31 | U |
| | 88-06-2 | 2,4,6-Trichlorophenol | PPB | | NA | (14) | 31 | U |
| | 120-83-2 | 2,4-Dichlorophenol | PPB | | NA | (14) | 31 | U |
| | 105-67-9 | 2,4-Dimethylphenol | PPB | | NA | (14) | 31 | U |
| | 51-28-5 | 2,4-Dinitrophenol | PPB | | NA | (14) | 61 | U |
| | 121-14-2 | 2,4-Dinitrotoluene | PPB | | NA | (14) | 31 | U |
| | 606-20-2 | 2,6-Dinitrotoluene | PPB | | NA | (14) | 61 | U |
| | 91-58-7 | 2-Chloronaphthalene | PPB | | NA | (14) | 31 | U |
| | 95-57-8 | 2-Chlorophenol | PPB | | NA | (14) | 31 | U |
| | 91-57-6 | 2-Methylnaphthalena | PPB | | NA | (14) | 31 | U |
| | 95-48-7 | 2-Methylphenol | PPB | | 330 | (14) | 31 | U |
| | 88-74-4 | 2-Nitroaniline | PPB | | NA | (14) | 31 | U |
| | 88-75-5 | 2-Nitrophenol | PPB | | NA | (14) | 61 | U |
| | 91-94-1 | 3,3'-Dichlorobenzidine | PPB | | NA | (14) | 31 | U |
| | 108-39--4/106-44 | 3+4-Methylphenol | PPB | | 330 | (14) | 31 | U |
| | 99-092-2 | 3-Nitroaniline | PPB | | NA | (14) | 31 | U |
| | 534-52-1 | 4,6-Dinitro-2-methylphenol | PPB | | NA | (14) | 61 | U |
| | 101-55-3 | 4-Bromophenyl pheny ether | PPB | | NA | (14) | 31 | U |
| | 59-50-7 | 4-Chloro-3-methylphenol | PPB | | NA | (14) | 31 | U |
| | 106-47-8 | 4-Chloroaniline | PPB | | NA | (14) | 31 | U |
| | 7005-72-3 | 4-Chlorpheny phenyl ether | PPB | | NA | (14) | 31 | U |
| | 100-01-6 | 4-Nitroaniline | PPB | | NA | (14) | 31 | B |
| | 100-02-7 | 4-Nitrophenol | PPB | | NA | (14) | 61 | U |
| | 83-32-9 | Acenaphthene | PPB | | 20000 | (14) | 31 | U |
| | 208-96-8 | Acenaphthylene | PPB | | 100000 | (14) | 31 | U |
| | 98-86-2 | Acetophenone | PPB | | NA | (14) | 31 | U |
| | 62-53-3 | Aniline | PPB | | NA | (14) | 31 | U |
| | 120-12-7 | Anthracene | PPB | | 100000 | (14) | 31 | U |
| | 1912-24-9 | Atrazine | PPB | | NA | (14) | 31 | U |
| | 103-33-3 | Azobenzene | PPB | | NA | (14) | 31 | U |
| | 100-52-7 | Benzaldehyde | PPB | | NA | (14) | 61 | U |
| | 92-87-5 | Benzidine | PPB | | NA | (14) | 61 | U |
| | 56-55-3 | Benzo(a) anthracene | PPB | | 1000 | (14) | 31 | U |
| | 50-32-8 | Benzo(a)pyrene | PPB | | 1000 | (14) | 31 | U |
| | 205-99-2 | Benzo(b)fluoranthene | PPB | | 1000 | (14) | 31 | U |
| | 191-24-2 | Benzo(g,h,i) perylene | PPB | | 100000 | (14) | 31 | U |
| | 207-08-9 | Benzo(k)fluoranthene | PPB | | 800 | (14) | 31 | U |
| | 65-85-0 | Benzoic acid | PPB | | NA | (14) | 61 | U |
| | 100-51-6 | Benzyl alcohol | PPB | | NA | (14) | 31 | U |
| | 92-52-4 | Biphenyl | PPB | | NA | (14) | 31 | U |
| | 111-91-1 | Bis(2-chloroethoxy)methane | PPB | | NA | (14) | 31 | U |
| | 111-44-4 | Bis(2-chloroethyl)ether | PPB | | NA | (14) | 31 | U |
| | 108-60-1 | Bis(2-chloroisopropyl)ether | PPB | | NA | (14) | 31 | U |
| | | Bis(2-ethylhexyl)phthalate | PPB | | NA | (14) | 31 | U |

FIG.15c

|  | 85-68-7 | Butyl benzyl phthalate | PPB | NA | (14) | 31 | U |
|---|---|---|---|---|---|---|---|
|  | 105-60-2 | Caprolactam | PPB | NA | (14) | 31 | U |
|  | 86-74-8 | Carbazole | PPB | NA | (14) | 31 | U |
|  | 2-18-01 | Chrysene | PPB | 1000 | (14) | 31 | U |
|  | 53-70-3 | Dibenzo(a,h)anthracene | PPB | 330 | (14) | 31 | U |
|  | 32-64-9 | Dibenzofuran | PPB | 7000 | (14) | 31 | U |
|  | 84-66-2 | Diethyl phthalate | PPB | NA | (14) | 31 | U |
|  | 131-11-3 | Dimethyl phthalate | PPB | NA | (14) | 31 | U |
|  | 84-74-2 | Di-n-butyl phthalate | PPB | NA | (14) | 31 | U |
|  | 117-84-0 | Di-n-octyl phthalate | PPB | NA | (14) | 61 | U |
|  | 206-44-0 | Fluoranthene | PPB | 100000 | (14) | 31 | U |
|  | 86-73-7 | Fluorene | PPB | 30000 | (14) | 31 | U |
|  | 118-74-1 | Hexachlorobenzene | PPB | 330 | (14) | 31 | U |
|  | 87-68-3 | Hexachlorobutadiene | PPB | NA | (14) | 31 | U |
|  | 77-47-4 | Hexachlorocyclopentadiene | PPB | NA | (14) | 61 | U |
|  | 67-72-1 | Hexachloroethane | PPB | NA | (14) | 31 | U |
|  | 193-39-5 | Indeno(1,2,3-c,d)pyrene | PPB | 500 | (14) | 31 | U |
|  | 78-59-1 | Isophorone | PPB | NA | (14) | 31 | U |
|  | 91-20-3 | Naphthalene | PPB | 12000 | (14) | 31 | U |
|  | 98-95-3 | Nitrobenzene | PPB | NA | (14) | 31 | U |
|  | 62-75-9 | N-Nitrosodimethylamine | PPB | NA | (14) | 31 | U |
|  | 621-64-7 | N-Nitrosodi-n-propylamine | PPB | NA | (14) | 31 | U |
|  | 86-30-6 | N-Nitrosodiphenylamine | PPB | NA | (14) | 31 | U |
|  | 56-38-2 | Parathion | PPB | NA | (14) | 61 | U |
|  | 87-86-5 | Pentachlorophenol | PPB | 800 | (14) | 61 | U |
|  | 85-01-8 | Phenanthrene | PPB | 10000 | (14) | 31 | U |
|  | 108-95-2 | Phenol | PPB | 330 | (14) | 31 | U |
|  | 129-00-0 | Pyrene | PPB | 100000 | (14) | 31 | U |
|  | 110-86-1 | Pyridine | PPB | NA | (14) | 31 | U |
| HERBICIDES |  |  |  |  |  |  |  |
|  | 93-76-5 | 2,4,5-T | PPB | NA | (14) | 1.2 | U |
|  | 93-72-1 | 2,4,5-TP | PPB | 3800 | (14) | 1.2 | U |
|  | 94-75-7 | 2,4-D | PPB | NA | (14) | 1.2 | U |
|  | 1918-00-9 | Dicamba | PPB | NA | (14) | 1.2 | U |
| PESTICIDES |  |  |  |  |  |  |  |
|  | 72-54-8 | 4,4'-DDD | PPB | 3.3 | (14) | 1.2 | U |
|  | 72-55-9 | 4,4'-DDE | PPB | 3.3 | (14) | 1.2 | U |
|  | 50-29-3 | 4,4'-DDT | PPB | 3.3 | (14) | 1.2 | U |
|  | 309-00-2 | Aldrin | PPB | 5 | (14) | 1.2 | U |
|  | 319-84-6 | alpha-BHC | PPB | 20 | (14) | 1.2 | U |
|  | 103-71-9 | alpha-Chlordane | PPB | 94 | (14) | 7.3 | U |
|  | 319-85-7 | beta-BHC | PPB | 36 | (14) | 1.2 | U |
|  | 510-15-6 | Chlorobenzilate | PPB | NA | (14) | 1.2 | U |
|  | 96-12-8 | DBCP | PPB | NA | (14) | 1.2 | U |
|  | 319-86-8 | delta-BHC | PPB | 40 | (14) | 1.2 | U |
|  | 60-57-1 | Dieldrin | PPB | 5 | (14) | 1.2 | U |

FIG.15d

| | | | | | | | |
|---|---|---|---|---|---|---|---|
| | 959-98-8 | Endosulfan I | PPB | | 2400 | (14) | 1.2 | U |
| | 33213-65-9 | Endosulfan II | PPB | | 2400 | (14) | 1.2 | U |
| | 1031-07-8 | Endosulfan II sulfate | PPB | | 2400 | (14) | 1.2 | U |
| | 72-20-8 | Endrin | PPB | | 14 | (14) | 1.2 | U |
| | 7421-93-4 | Endrin aldehyde | PPB | | NA | (14) | 1.2 | U |
| | 53494-70-5 | Endrin ketone | PPB | | NA | (14) | 1.2 | U |
| | 58-89-9 | gamma-BHC | PPB | | 100 | (14) | 1.2 | U |
| | 5566-34-7 | gamma-Chlordane | PPB | | NA | (14) | 7.3 | U |
| | 56-44-8 | Heptachlor | PPB | | 42 | (14) | 2.4 | U |
| | 1024-57-3 | Heptachlor epoxide | PPB | | NA | (14) | 1.2 | U |
| | 118-74-1 | Hexachlorobenzene | PPB | | 330 | (14) | 1.2 | U |
| | 77-47-4 | Hexachlorocyclopentadiene | PPB | | NA | (14) | 3.7 | U |
| | 72-43-5 | Methoxychlor | PPB | | NA | (14) | 1.2 | U |
| | 8001-35-2 | Hexachlorobutadiene | PPB | | NA | (14) | 15 | U |
| PCBS | | | | | | | | |
| | 12674-11-2 | Aroclor 1016 | PPB | | 100 | (14) | 12 | U |
| | 11104-28-2 | Aroclor 1221 | PPB | | 100 | (14) | 12 | U |
| | 11141-61-5 | Aroclor 1232 | PPB | | 100 | (14) | 12 | U |
| | 53469-21-9 | Aroclor 1242 | PPB | | 100 | (14) | 12 | U |
| | 12672-28-6 | Aroclor 1248 | PPB | | 100 | (14) | 12 | U |
| | 11097-69-1 | Aroclor 1254 | PPB | | 100 | (14) | 12 | U |
| | 11096-82-5 | Aroclor 1260 | PPB | | 100 | (14) | 12 | U |
| | 37324-23-5 | Aroclor 1262 | PPB | | 100 | (14) | 12 | U |
| | 11100-14-4 | Aroclor 1268 | PPB | | 100 | (14) | 12 | U |
| METALS | | | | | | | | |
| | 7429-90-5 | Aluminum | PPM | | NA | (14) | 978 | |
| | 7440-36-0 | Antimony | PPM | | NA | (14) | 0.242 | U |
| | 7440-38-2 | Arsenic | PPM | | 13 | (14) | 0.805 | |
| | 7440-39-3 | Barium | PPM | | 350 | (14) | 3.92 | |
| | 7440-41-7 | Beryllium | PPM | | 7.2 | (14) | 0.121 | U |
| | 7440-43-9' | Cadmium | PPM | | 2.5 | (14) | 0.121 | U |
| | 7440-70-2' | Calcium | PPM | | NA | (14) | 645 | |
| | 7440-47-3' | Chromium | PPM | | NA | (14) | 2.49 | |
| | 7440-48-4 | Cobalt | PPM | | NA | (14) | 0.121 | U |
| | 7440-50-8 | Copper | PPM | | 50 | (14) | 2.06 | |
| | 7439-89-6 | Iron | PPM | | NA | (14) | 2910 | |
| | 7439-92-1 | Lead | PPM | | 63 | (14) | 1.87 | |
| | 7439-95-4 | Magnesium | PPM | | NA | (14) | 384 | |
| | 7439-96-5 | Manganese | PPM | | 1600 | (14) | 61.9 | |
| | 7439-97-6 | Mercury | PPM | | 0.18 | (14) | 0.00803 | U |
| | 7440-02-0 | Nickel | PPM | | 30 | (14) | 2.57 | |
| | 7440-09-7 | Potassium | PPM | | NA | (14) | 97.1 | |
| | 7782-49-2 | Selenium | PPM | | 3.9 | (14) | 0.242 | U |
| | 7440-22-1 | Silver | PPM | | 2 | (14) | 0.121 | U |
| | 7440-23-5 | Sodium | PPM | | NA | (14) | 14.9 | |
| | 7440-28-0 | Thallium | PPM | | NA | (14) | 0.363 | U |

FIG.15e

| | 7440-62-2 | Vanadium | PPM | NA | (14) | 306 | |
|---|---|---|---|---|---|---|---|
| | 7440-62-6 | Zinc | PPM | 109 | (14) | 6.56 | |
| WET CHEMISTRARY | | | | | | | |
| | 72-20-8 | Chromium, Hexavalent | PPM | 1 | (14) | 0.291 | U |
| | 7421-93-4 | Chromium, Trivalent | PPM | 30 | (14) | 2.49 | |
| | 53494-70-5 | Cyanide Total & Amenable | PPM | 27 | (14) | 0.0612 | U |
| | 58-89-9 | Percent Moisture | wt% | NA | (14) | 18.3 | |

FIG.15f

| Table 3 | | | | | | | |
|---|---|---|---|---|---|---|---|
| VOC | CasNo | Analyte | Units | Limits | | | Q |
| | 630-20-6 | 1,1,1,2-Tetrachloroethane | PPB | NA | (22) | 1 | U |
| | 71-55-6 | 1,1,1,-Trichloroethane | PPB | 680 | (22) | 1 | U |
| | 79-34-5 | 1,1,2,2-Tetrachloroethane | PPB | NA | (22) | 1 | U |
| | 79-34-5 | 1,1,2,2-Tetrachloroethane | PPB | NA | (22) | 1 | U |
| | 79-34-5 | 1,1,2,2-Tetrachloroethane | PPB | NA | (22) | 1 | U |
| | 75-34-3 | 1,1-Dichloroethane | PPB | 270 | (22) | 1 | U |
| | 75-35-4 | 1,1-Dichloroethene | PPB | 330 | (22) | 1 | U |
| | 563-58-6 | 1,1-Dichloropropene | PPB | NA | (22) | 1 | U |
| | 87-61-6 | 1,2,3-Trichlorobenzene | PPB | NA | (22) | 1 | U |
| | 96-18-4 | 1,2,3-Trichloropropane | PPB | NA | (22) | 1 | U |
| | 95-93-2 | 1,2,3,4,5-Tetramethylbenzene | PPB | NA | (22) | 1 | U |
| | 120-82-1 | 1,1,2,4-Trichlorobenzene | PPB | NA | (22) | 1 | U |
| | 95-63-6 | 1,1,2,4-Trimethylbenzene | PPB | 3600 | (22) | 1 | U |
| | 96-12-8 | 1,2-Dibromo-3-chloropropane | PPB | NA | (22) | 1 | U |
| | 106-93-4 | 1,2-Dibromoethane | PPB | NA | (22) | 1 | U |
| | 95-50-1 | 1,2-Dichlorobenzene | PPB | 1100 | (22) | 1 | U |
| | 107-06-2 | 1,2-Dichloroethane | PPB | 20 | (22) | 1 | U |
| | 78-87-5 | 1,2-Dichloropropane | PPB | NA | (22) | 1 | U |
| | 108-67-8 | 1,3,5-Trimethylbenzene | PPB | 8400 | (22) | 1 | U |
| | 541-73-1 | 1,3-Dichlorobenzene | PPB | 2400 | (22) | 1 | U |
| | 142-28-9 | 1,3-dichloropropane | PPB | NA | (22) | 1 | U |
| | 106-46-7 | 1,4-Dichlorobenzene | PPB | 1800 | (22) | 1 | U |
| | 123-91-1 | 1,4-Dioxane | PPB | 100 | (22) | 1 | U |
| | 594-20-7 | 2,2-Dichloropropane | PPB | NA | (22) | 1 | U |
| | 78-93-3 | 2-Butanone | PPB | 120 | (22) | 5.2 | J |
| | 110-75-8 | 2-Chloroethyl vinyl ether | PPB | NA | (22) | 1 | U |
| | 95-49-8 | 2-Chlorotoluene | PPB | NA | (22) | 1 | U |
| | 591-78-6 | 2-Hexanone | PPB | NA | (22) | 5.1 | U |
| | 67-63-0 | 2-Propanol | PPB | NA | (22) | 1 | U |
| | 106-43-4 | 4-Chlorotoluene | PPB | NA | (22) | 1 | U |
| | 99-87-6 | 4-Isopropyltoluene | PPB | NA | (22) | 1 | U |
| | 108-10-1 | 4-Methyl-2-pentanone | PPB | NA | (22) | 5.1 | U |
| | 67-64-1 | Acetone | PPB | 50 | (22) | 23 | B |
| | 107-02-8 | Acrolein | PPB | NA | (22) | 13 | U |
| | 107-13-1 | Acrylonitrile | PPB | NA | (22) | 1 | U |
| | 71-43-2 | Benzene | PPB | 60 | (22) | 1 | U |
| | 108-86-1 | Bromobenzene | PPB | NA | (22) | 1 | U |
| | 74-97-5 | Bromochloromethane | PPB | NA | (22) | 1 | U |
| | 75-27-4 | Bromodichloromethane | PPB | NA | (22) | 1 | U |
| | 75-25-2 | Bromoform | PPB | NA | (22) | 1 | U |

FIG.16a

| CAS | Name | Unit | Value | (Ref) | Qty | Flag |
|---|---|---|---|---|---|---|
| 74-83-9 | Bromomethane | PPB | NA | (22) | 1 | U |
| 75-15-0 | Carbon disulfide | PPB | NA | (22) | 1 | U |
| 56-23-5 | Carbon tetrachloride | PPB | 760 | (22) | 1 | U |
| 108-90-7 | Chlorobenzene | PPB | 1100 | (22) | 1 | U |
| 75-45-6 | Chlorodifluoromethane | PPB | NA | (22) | 1 | U |
| 75-00-3 | Chloroethane | PPB | NA | (22) | 1 | U |
| 67-66-3 | Chloroform | PPB | 370 | (22) | 1 | U |
| 74-87-3 | Chloromethane | PPB | NA | (22) | 1 | U |
| 156-59-2 | cis-1,2-Dichloroethene | PPB | 250 | (22) | 1 | U |
| 10061-01-5 | cis-1,3-Dichloropropene | PPB | NA | (22) | 1 | U |
| 110-82-7 | Cyclohexame | PPB | NA | (22) | 2 | U |
| 124-48-1 | Dibromochloromethane | PPB | NA | (22) | 1 | U |
| 74-95-3 | Dibromomethane | PPB | NA | (22) | 1 | U |
| 75-71-8 | Dichlorodifluoromethane | PPB | NA | (22) | 1 | U |
| 108-20-3 | Diisopropyl ether | PPB | NA | (22) | 1 | U |
| 64-17-5 | Ethanol | PPB | NA | (22) | 10 | U |
| 100-41-4 | Ethylbenzene | PPB | 1000 | (22) | 1 | U |
| 76-14-2 | Freon-114 | PPB | NA | (22) | 1 | U |
| 87-68-3 | Hexachlorobutadiene | PPB | NA | (22) | 1 | U |
| 98-82-8 | Isopropylbenzene | PPB | NA | (22) | 1 | U |
| 179601-23-1 | m,p-Xylene | PPB | 1600 | (22) | 2 | U |
| 79-20-9 | Methyl Acetate | PPB | NA | (22) | 1 | U |
| 1634-04-4 | Methyl tert-butyl ether | PPB | 930 | (22) | 1 | U |
| 75-09-2 | Methylene chloride | PPB | 50 | (22) | 18 | B |
| 91-20-3 | Naphthalene | PPB | NA | (22) | 1 | U |
| 104-51-8 | n-Butylbenzene | PPB | 12000 | (22) | 1 | U |
| 103-65-1 | n-Propylbenzene | PPB | 3900 | (22) | 1 | U |
| 95-47-6 | o-Xylene | PPB | 1600 | (22) | 1 | U |
| 105-05-5 | p-Diethylbenzene | PPB | NA | (22) | 1 | U |
| 622-96-8 | p-Ethyltoluene | PPB | NA | (22) | 1 | U |
| 135-98-8 | sec-Butylbenze | PPB | 11000 | (22) | 1 | U |
| 100-42-5 | Styrene | PPB | NA | (22) | 1 | U |
| 75-65-0 | St-Butyl alcohol | PPB | NA | (22) | 2.5 | U |
| 98-06-6 | tert-Butylbenzene | PPB | 5900 | (22) | 1 | U |
| 127-18-4 | Tetrachloroethene | PPB | 1300 | (22) | 1 | U |
| 108-88-3 | Toluene | PPB | 700 | (22) | 1 | U |
| 156-60-5 | trans-1,2-Dichloroethene | PPB | 190 | (22) | 1 | U |
| 10061-02-6 | trans-1,3-Dichloropropene | PPB | NA | (22) | 1 | U |
| 79-01-6 | Trichloroethene | PPB | 470 | (22) | 1 | U |
| 75-69-4 | Trichlorofluoromethane | PPB | NA | (22) | 1 | U |
| 108-05-4 | Vinyl acetate | PPB | NA | (22) | 1 | U |
| 75-01-4 | Vinyl chloride | PPB | 20 | (22) | 1 | U |
| 1330-20-7 | Xylenes, Total | PPB | 1600 | (22) | 3 | U |
| SVOC | | | | | | |
| 120-82-1 | 1,2,4-Trichlorobenzene | PPB | NA | (22) | 25 | U |
| 95-50-1 | 1,2-Dichlorobenzene | PPB | 1100 | (22) | 25 | U |

FIG.16b

| | | | | | | |
|---|---|---|---|---|---|---|
| 541-73-1 | 1,3-Dichlorobenzene | PPB | 2400 | (22) | 25 | U |
| 106-46-7 | 1,4-Dichlorobenze | PPB | 1800 | (22) | 25 | U |
| 95-95-4 | 2,4,5-Trichlorophenol | PPB | NA | (22) | 25 | U |
| 88-06-2 | 2,4,6-Trichlorophenol | PPB | NA | (22) | 25 | U |
| 120-83-2 | 2,4-Dichlorophenol | PPB | NA | (22) | 25 | U |
| 105-67-9 | 2,4-Dimethylphenol | PPB | NA | (22) | 25 | U |
| 51-28-5 | 2,4-Dinitrophenol | PPB | NA | (22) | 50 | U |
| 121-14-2 | 2,4-Dinitrotoluene | PPB | NA | (22) | 25 | U |
| 606-20-2 | 2,6-Dinitrotoluene | PPB | NA | (22) | 50 | U |
| 91-58-7 | 2-Chloronaphthalene | PPB | NA | (22) | 25 | U |
| 95-57-8 | 2-Chlorophenol | PPB | NA | (22) | 25 | U |
| 91-57-6 | 2-Methylnaphthalena | PPB | NA | (22) | 25 | U |
| 95-48-7 | 2-Methylphenol | PPB | 330 | (22) | 25 | U |
| 88-74-4 | 2-Nitroaniline | PPB | NA | (22) | 25 | U |
| 88-75-5 | 2-Nitrophenol | PPB | NA | (22) | 50 | U |
| 91-94-1 | 3,3'-Dichlorobenzidine | PPB | NA | (22) | 25 | U |
| 108-39--4/106-44 | 3+4-Methylphenol | PPB | 330 | (22) | 25 | U |
| 99-092-2 | 3-Nitroaniline | PPB | NA | (22) | 25 | U |
| 534-52-1 | 4,6-Dinitro-2-methylphenol | PPB | NA | (22) | 50 | U |
| 101-55-3 | 4-Bromophenyl pheny ether | PPB | NA | (22) | 25 | U |
| 59-50-7 | 4-Chloro-3-methylphenol | PPB | NA | (22) | 25 | U |
| 106-47-8 | 4-Chloroaniline | PPB | NA | (22) | 25 | U |
| 7005-72-3 | 4-Chloropheny phenyl ether | PPB | NA | (22) | 25 | U |
| 100-01-6 | 4-Nitroaniline | PPB | NA | (22) | 25 | B |
| 100-02-7 | 4-Nitrophenol | PPB | NA | (22) | 50 | U |
| 83-32-9 | Acenaphthene | PPB | 98000 | (22) | 25 | U |
| 208-96-8 | Acenaphthylene | PPB | 107000 | (22) | 25 | U |
| 98-86-2 | Acetophenone | PPB | NA | (22) | 49 | J |
| 62-53-3 | Aniline | PPB | NA | (22) | 25 | U |
| 120-12-7 | Anthracene | PPB | 1000000 | (22) | 25 | U |
| 1912-24-9 | Atrazine | PPB | NA | (22) | 25 | U |
| 103-33-3 | Azobenzene | PPB | NA | (22) | 25 | U |
| 100-52-7 | Benzaldehyde | PPB | NA | (22) | 50 | U |
| 92-87-5 | Benzidine | PPB | NA | (22) | 50 | U |
| 56-55-3 | Benzo(a) anthracene | PPB | 1000 | (22) | 54 | J |
| 50-32-8 | Benzo(a)pyrene | PPB | 22000 | (22) | 40 | J |
| 205-99-2 | Benzo(b)fluoranthene | PPB | 1700 | (22) | 130 | J |
| 191-24-2 | Benzo(g,h,i) perylene | PPB | 1000000 | (22) | 110 | J |
| 207-08-9 | Benzo(k)fluoranthene | PPB | 1700 | (22) | 89 | J |
| 65-85-0 | Benzoic acid | PPB | NA | (22) | 50 | U |
| 100-51-6 | Benzyl alcohol | PPB | NA | (22) | 44 | J |
| 92-52-4 | Biphenyl | PPB | NA | (22) | 25 | U |
| 111-91-1 | Bis(2-chloroethoxy)methane | PPB | NA | (22) | 25 | U |
| 111-44-4 | Bis(2-chloroethyl)ether | PPB | NA | (22) | 25 | U |
| 108-60-1 | Bis(2-chloroisopropyl)ether | PPB | NA | (22) | 25 | U |
| | Bis(2-ethylhexyl)phthalate | PPB | NA | (22) | 200 | J |

FIG.16c

|  | 85-68-7 | Butyl benzyl phthalate | PPB | NA | (22) | 41 | J |
|---|---|---|---|---|---|---|---|
|  | 105-60-2 | Caprolactam | PPB | NA | (22) | 25 | U |
|  | 86-74-8 | Carbazole | PPB | NA | (22) | 25 | U |
|  | 2-18-01 | Chrysene | PPB | 1000 | (22) | 130 | J |
|  | 53-70-3 | Dibenzo(a,h)anthracene | PPB | 1000000 | (22) | 25 | U |
|  | 32-64-9 | Dibenzofuran | PPB | 21000 | (22) | 25 | U |
|  | 84-66-2 | Diethyl phthalate | PPB | NA | (22) | 1100 |  |
|  | 131-11-3 | Dimethyl phthalate | PPB | NA | (22) | 67 | J |
|  | 84-74-2 | Di-n-butyl phthalate | PPB | NA | (22) | 140 | J |
|  | 117-84-0 | Di-n-octyl phthalate | PPB | NA | (22) | 50 | U |
|  | 206-44-0 | Fluoranthene | PPB | 1000000 | (22) | 170 | J |
|  | 86-73-7 | Fluorene | PPB | 386000 | (22) | 25 | U |
|  | 118-74-1 | Hexachlorobenzene | PPB | 3200 | (22) | 25 | U |
|  | 87-68-3 | Hexachlorobutadiene | PPB | NA | (22) | 25 | U |
|  | 77-47-4 | Hexachlorocyclopentadiene | PPB | NA | (22) | 50 | U |
|  | 67-72-1 | Hexachloroethane | PPB | NA | (22) | 25 | U |
|  | 193-39-5 | Indeno(1,2,3-c,d)pyrene | PPB | 8200 | (22) | 97 | J |
|  | 78-59-1 | Isophorone | PPB | NA | (22) | 25 | U |
|  | 91-20-3 | Naphthalene | PPB | 12000 | (22) | 25 | U |
|  | 98-95-3 | Nitrobenzene | PPB | NA | (22) | 25 | U |
|  | 62-75-9 | N-Nitrosodimethylamine | PPB | NA | (22) | 25 | U |
|  | 621-64-7 | N-Nitrosodi-n-propylamine | PPB | NA | (22) | 25 | U |
|  | 86-30-6 | N-Nitrosodiphenylamine | PPB | NA | (22) | 25 | U |
|  | 56-38-2 | Parathion | PPB | NA | (22) | 50 | B |
|  | 87-86-5 | Pentachlorophenol | PPB | 800 | (22) | 50 | U |
|  | 85-01-8 | Phenanthrene | PPB | 1000000 | (22) | 100 | J |
|  | 108-95-2 | Phenol | PPB | 330 | (22) | 48 | J |
|  | 129-00-0 | Pyrene | PPB | 1000000 | (22) | 96 | J |
|  | 110-86-1 | Pyridine | PPB | NA | (22) | 25 | U |
| HERBICIDES |  |  |  |  |  |  |  |
|  | 93-76-5 | 2,4,5-T | PPB | NA | (22) | 1.2 | J |
|  | 93-72-1 | 2,4,5-TP | PPB | 3800 | (22) | 1 | U |
|  | 94-75-7 | 2,4-D | PPB | NA | (22) | 7 | P |
|  | 1918-00-9 | Dicamba | PPB | NA | (22) | 1 | U |
| PESTICIDES |  |  |  |  |  |  |  |
|  | 72-54-8 | 4,4'-DDD | PPB | 14000 | (22) | 1 | P |
|  | 72-55-9 | 4,4'-DDE | PPB | 17000 | (22) | 16 |  |
|  | 50-29-3 | 4,4'-DDT | PPB | 136000 | (22) | 1.3 | J |
|  | 309-00-2 | Aldrin | PPB | 190 | (22) | 1 | U |
|  | 319-84-6 | alpha-BHC | PPB | 20 | (22) | 1 | U |
|  | 103-71-9 | alpha-Chlordane | PPB | 2900 | (22) | 6 | U |
|  | 319-85-7 | beta-BHC | PPB | 90 | (22) | 1 | U |
|  | 510-15-6 | Chlorobenzilate | PPB | NA | (22) | 1 | U |
|  | 96-12-8 | DBCP | PPB | NA | (22) | 1 | U |
|  | 319-86-8 | delta-BHC | PPB | 250 | (22) | 1 | U |
|  | 60-57-1 | Dieldrin | PPB | 100 | (22) | 1 | U |

FIG.16d

| | | | | | | | |
|---|---|---|---|---|---|---|---|
| | 959-98-8 | Endosulfan I | PPB | 102000 | (22) | 1.3 | U |
| | 33213-65-9 | Endosulfan II | PPB | 102000 | (22) | 1 | U |
| | 1031-07-8 | Endosulfan II sulfate | PPB | 1000000 | (22) | 1 | U |
| | 72-20-8 | Endrin | PPB | 60 | (22) | 1 | U |
| | 7421-93-4 | Endrin aldehyde | PPB | NA | (22) | 1 | U |
| | 53494-70-5 | Endrin ketone | PPB | NA | (22) | 1 | U |
| | 58-89-9 | gamma-BHC | PPB | 100 | (22) | 1 | U |
| | 5566-34-7 | gamma-Chlordane | PPB | NA | (22) | 7 | U |
| | 56-44-8 | Heptachlor | PPB | 380 | (22) | 2 | U |
| | 1024-57-3 | Heptachlor epoxide | PPB | NA | (22) | 3.7 | |
| | 118-74-1 | Hexachlorobenzene | PPB | NA | (22) | 1 | U |
| | 77-47-4 | Hexachlorocyclopentadiene | PPB | NA | (22) | 3 | U |
| | 72-43-5 | Methoxychlor | PPB | NA | (22) | 1 | U |
| | 8001-35-2 | Hexachlorobutadiene | PPB | NA | (22) | 13 | U |
| PCBS | | | | | | | |
| | 12674-11-2 | Aroclor 1016 | PPB | 3200 | (22) | 10 | U |
| | 11104-28-2 | Aroclor 1221 | PPB | 3200 | (22) | 10 | U |
| | 11141-61-5 | Aroclor 1232 | PPB | 3200 | (22) | 10 | U |
| | 53469-21-9 | Aroclor 1242 | PPB | 3200 | (22) | 10 | U |
| | 12672-28-6 | Aroclor 1248 | PPB | 3200 | (22) | 10 | U |
| | 11097-69-1 | Aroclor 1254 | PPB | 3200 | (22) | 10 | U |
| | 11096-82-5 | Aroclor 1260 | PPB | 3200 | (22) | 10 | U |
| | 37324-23-5 | Aroclor 1262 | PPB | 3200 | (22) | 10 | U |
| | 11100-14-4 | Aroclor 1268 | PPB | 3200 | (22) | 10 | U |
| METALS | | | | | | | |
| | 7429-90-5 | Aluminum | PPM | NA | (22) | 22500 | D |
| | 7440-36-0 | Antimony | PPM | NA | (22) | 0.23 | J |
| | 7440-38-2 | Arsenic | PPM | 16 | (22) | 13.8 | |
| | 7440-39-3 | Barium | PPM | 820 | (22) | 44.4 | |
| | 7440-41-7 | Beryllium | PPM | 47 | (22) | 0.0988 | U |
| | 7440-43-9' | Cadmium | PPM | 7.5 | (22) | 0.132 | J |
| | 7440-70-2' | Calcium | PPM | NA | (22) | 4350 | |
| | 7440-47-3' | Chromium | PPM | NA | (22) | 24 | |
| | 7440-48-4 | Cobalt | PPM | NA | (22) | 0.0988 | U |
| | 7440-50-8 | Copper | PPM | 1720 | (22) | 24.5 | |
| | 7439-89-6 | Iron | PPM | NA | (22) | 22500 | D |
| | 7439-92-1 | Lead | PPM | 450 | (22) | 29.3 | |
| | 7439-95-4 | Magnesium | PPM | NA | (22) | 2610 | |
| | 7439-96-5 | Manganese | PPM | 2000 | (22) | 259 | |
| | 7439-97-6 | Mercury | PPM | 0.73 | (22) | 0.0975 | |
| | 7440-02-0 | Nickel | PPM | 130 | (22) | 15.1 | |
| | 7440-09-7 | Potassium | PPM | NA | (22) | 1300 | |
| | 7782-49-2 | Selenium | PPM | 4 | (22) | 0.198 | U |
| | 7440-22-1 | Silver | PPM | 8.3 | (22) | 0.0988 | U |
| | 7440-23-5 | Sodium | PPM | NA | (22) | 280 | |
| | 7440-28-0 | Thallium | PPM | NA | (22) | 1.1 | |

FIG.16e

| | 7440-62-2 | Vanadium | PPM | NA | (22) | 30 | |
|---|---|---|---|---|---|---|---|
| | 7440-62-6 | Zinc | PPM | 2480 | (22) | 56 | |
| WET CHEMISTRARY | | | | | | | |
| | 72-20-8 | Chromium, Hexavalent | PPM | 19 | (22) | 0.249 | U |
| | 7421-93-4 | Chromium, Trivalent | PPM | NA | (22) | 24 | |
| | 53494-70-5 | Cyanide Total & Amenable | PPM | 40 | (22) | 0.716 | J |
| | 58-89-9 | Percent Moisture | wt% | NA | (22) | 0.81 | |

FIG.16f

METHOD FOR SORTING SOIL

CROSS-REFERENCE TO RELATED APPLICATIONS

The present application is a continuation of U.S. Pat. No. 10,710,097, filed Jul. 22, 2019, which a continuation of U.S. Pat. No. 10,357,779, filed May 23, 2018, which claims the benefit of and priority to U.S. Provisional Patent Application No. 62/510,901, filed on May 25, 2017, the entire contents of each of which are hereby incorporated by reference.

BACKGROUND

Technical Field

This application relates in general to the field of remediation of contaminated matter, and in particular, to the field of remediation of soil matter including organic and non-organic matter, i.e., soil matter which is formed as residuals from civil/construction projects. More specifically, the application relates to a sorting plant/station for separating, sizing, and classifying a selected matter from a mixture of materials, which may include organic matter, loam, soil, rocks, sand, and the like.

Description of Related Art

Soil contamination is common in every country. Once the soil becomes contaminated, precipitation may infiltrate through the soil and carry contaminants downward into groundwater. Groundwater is a primary source of drinking water in some areas around the world, i.e., in the Unites States it represents about fifty percent of the country's drinking water. When the contaminated soil is left untreated, contaminants may not only carry contaminants downward into groundwater, but also it could affect the environment, and finally negatively affect human health. Thus, the mitigation of contaminants in the subsurface is an issue that needs to be addressed.

One of the main sources for soil contamination is construction sites. Construction sites produce massive amounts of construction waste and displace a great quantity of soil. Construction waste generated during civil developments like construction projects, road improvement, demolitions, and the like have created difficulties across the United States (difficulties of the environmental and/or financial type). When it comes to difficulties of the economic type, construction waste can increase the overall cost of any civil construction project. For example, when builders construct or demolish buildings, bridges and the like they likely will generate some waste matter or debris. In particular cases, this waste matter remains confined to specific items. These items could include specific construction materials such as drywall, concrete, bricks etc. To comply with prescribed regulations, builders need to reuse or recycle some part of this waste. Alternatively, the hiring of a waste disposal company is needed which is cost prohibitive. The waste removal company or the waste removers will not only collect and sort the waste based on its recyclable value, but the company will also dispose of the waste at the landfill causing an environmental impact, while only some will get deposited for recycling.

Therefore, builders can find themselves stocked with oversized piles of matter, sometimes contaminated, which eventually needs to be removed, transported, and discarded from the property. Matter can be typically classified into three main categories: organic-rich topsoils, sand, and organic-containing loam (silty sand or strata). Waste removers have created markets where matter can be sold for a profit. Within these markets there may be existing markets for organic-rich topsoil, and sand. However, the organic-containing loam (silty sand or strata) is not easily marketable and is generally stockpiled off-site. Stockpiles off-site are common at many construction sites and recycling centers across the United States.

One of the reasons why organic-containing loam is not marketable is due to its organic components. Within these organic components, silty sand can be found. When trying to classify silty sand, silty sand lacks enough organic content to be re-used as topsoil, but contains too much organic content to be used as a component in concrete, asphalt, or to be satisfactorily compactable for construction and fill purposes. Thus, the silty sand stockpiles continue to grow at recycling facilities or are illegally dumped across the United States.

Therefore, a need exists for more efficient ways to process, recycle, or dispose of contaminated soil, organic-containing loam, and the like.

SUMMARY

Existing challenges associated with the foregoing, as well as other challenges, are overcome by methods for sorting or washing matter and also by systems, and apparatuses that operate in accordance with the methods.

According to an embodiment herein, a system for sorting matter includes a sorting station comprising a hopper, at least one conveyor belt, a deck screener, including at least one mesh screen and at least one spray bar, a chute, having a tapering form, a prep screw, and a dewatering screen; wherein the deck screener is configured to have vibration applied thereto to separate a matter from a mixture of matters; and wherein the at least one spray bar is configured to wash the mixture of matter and further separate a selected matter from the mixture of matters.

In one example, the mixture of matters includes soil comprising at least one of silty sand, rocks, organic matter, or combinations thereof.

In another example, the at least one spray bar is configured to wash the mixture at a rate of about 800 GPM to about 1000 GPM, although other rates are contemplated depending on the size of the sorting station.

The at least one spray bar includes a water storing tank or a water pond operably connected to the deck screener in a further example.

In yet another example, the sorting station further includes a water storing tank or a water pond operably connected to the deck screener.

In selected examples, the sorting station further comprises a settler, where a flocculent polymer is added to the settler.

In one example, the sorting station further comprises a pump operably connected to the settler.

The pump may be configured to pump a fluid from the water pond or the storage tank into the deck screen and return the fluid to the water pond the water pond or the storage tank in a closed loop configuration in a further example.

The deck screener is configured to separate the mixture at least into top soil or organic fine material and sand in a further example.

According to another embodiment herein, a method for sorting a particular matter from a mixture of matters is provided, wherein the method includes providing a mixture with organic matter and earthy material; and sorting at least one matter from the mixture of matters, wherein the sorting includes: selecting at least one matter to be sorted; washing the mixture containing the at least one matter with a solvent; transporting the mixture of matters via a conveyor belt, wherein the mixture is disposed onto a deck screener including three filtration membranes; separating at least one matter from the mixture by applying vibration to the mixture at the deck screener; and piling the at least one matter, wherein the at least one matter is a fine matter having a size from about 0.75 µm to about 6.3 mm.

In one example, the mixture further includes toxic substances which are substantially reduced after the sorting.

In another example, the mixture further includes a first quantity of chemicals and pesticides and the at least one matter includes a second quantity of chemicals and pesticides, the second quantity being substantially less than the first quantity.

In yet another example, the second quantity is substantially less than the first quantity.

According to another embodiment herein, a process of filtering soil includes providing a soil inlet operably connected to a deck screener frame, wherein the deck screener frame includes one or more screen decks membranes disposed one above the other; providing a conveyor belt operably connected to each screen deck membrane; providing a chute operably connected to the deck screener frame; providing a sand screw operably connected to the chute and a retention pond; providing a dewatering screen operably connected to the sand screw and the retention pond; providing a conveyor belt operably connected to the dewatering screen; and permeating soil in repeated cycles by (i) adding a selected volume of soil to the soil inlet, wherein the soil travels from the soil inlet to the deck screener frame via a conveyor belt, (ii) withdrawing a volume of water through the deck screener frame and a spray bar; and (iii) after the adding step (i), performing a separation comprising: (A) permeating the soil through the one or more screen decks membranes, wherein the soil is separated into four matters; (B) permeating one of the four matters via the sand screw and flowing excess water to the retention pond; and (C) after the permeating step (B), permeating the one of the four matters via the dewatering screen flowing excess water to the retention pond.

BRIEF DESCRIPTION OF THE DRAWINGS

The accompanying drawings, which are incorporated in and constitute a part of this specification, illustrate embodiments of the present disclosure and, together with a general description of the present disclosure given above, and the detailed description of the embodiments given below, serve to explain the principles of the present disclosure.

FIGS. 14*a*-16*f* are sample tables including sample data in accordance with the present disclosure.

DETAILED DESCRIPTION

Figure 1:
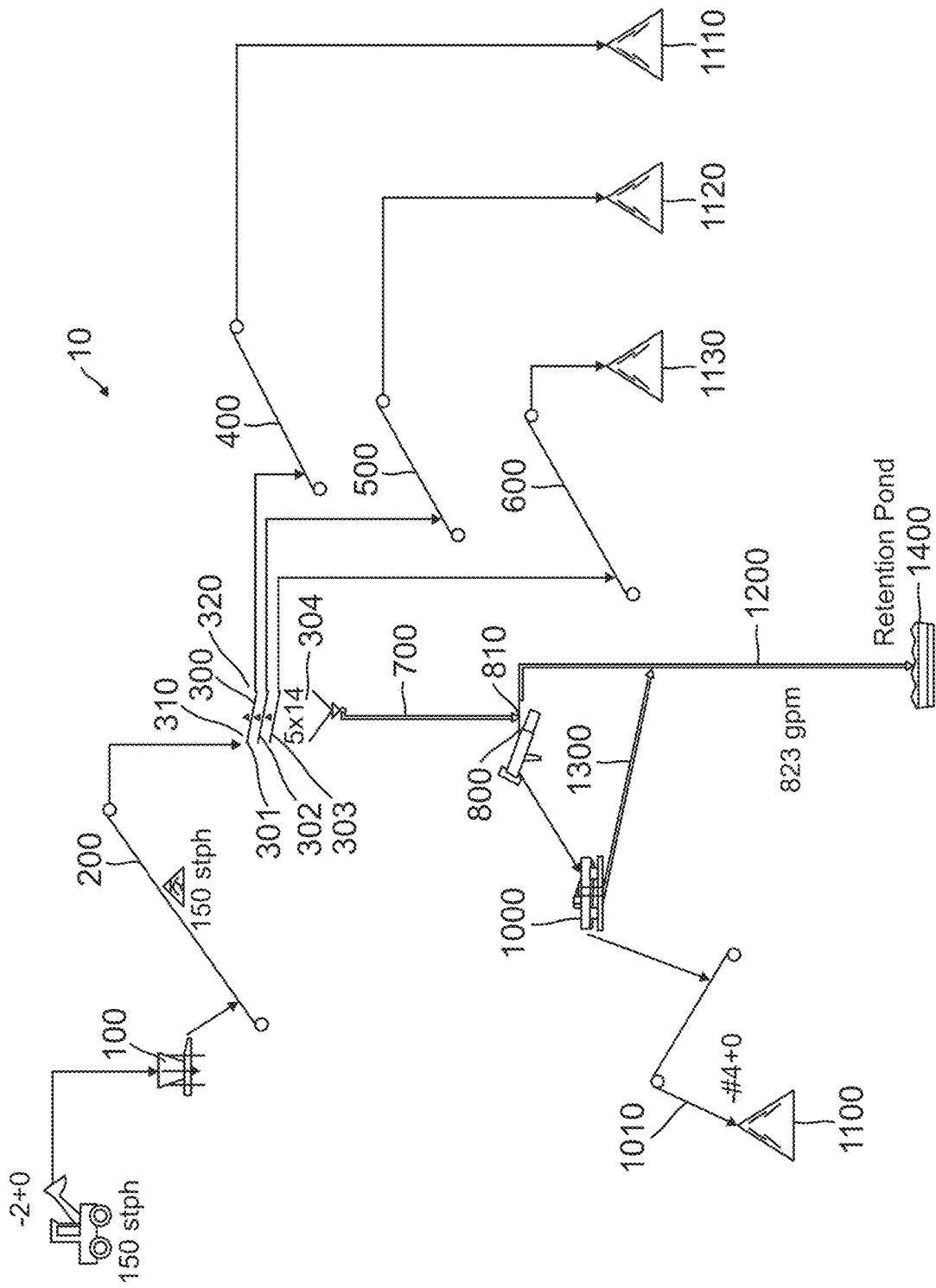
FIG. 1 is a diagram illustrating a sorting station in accordance with the present disclosure.
Figure 2:
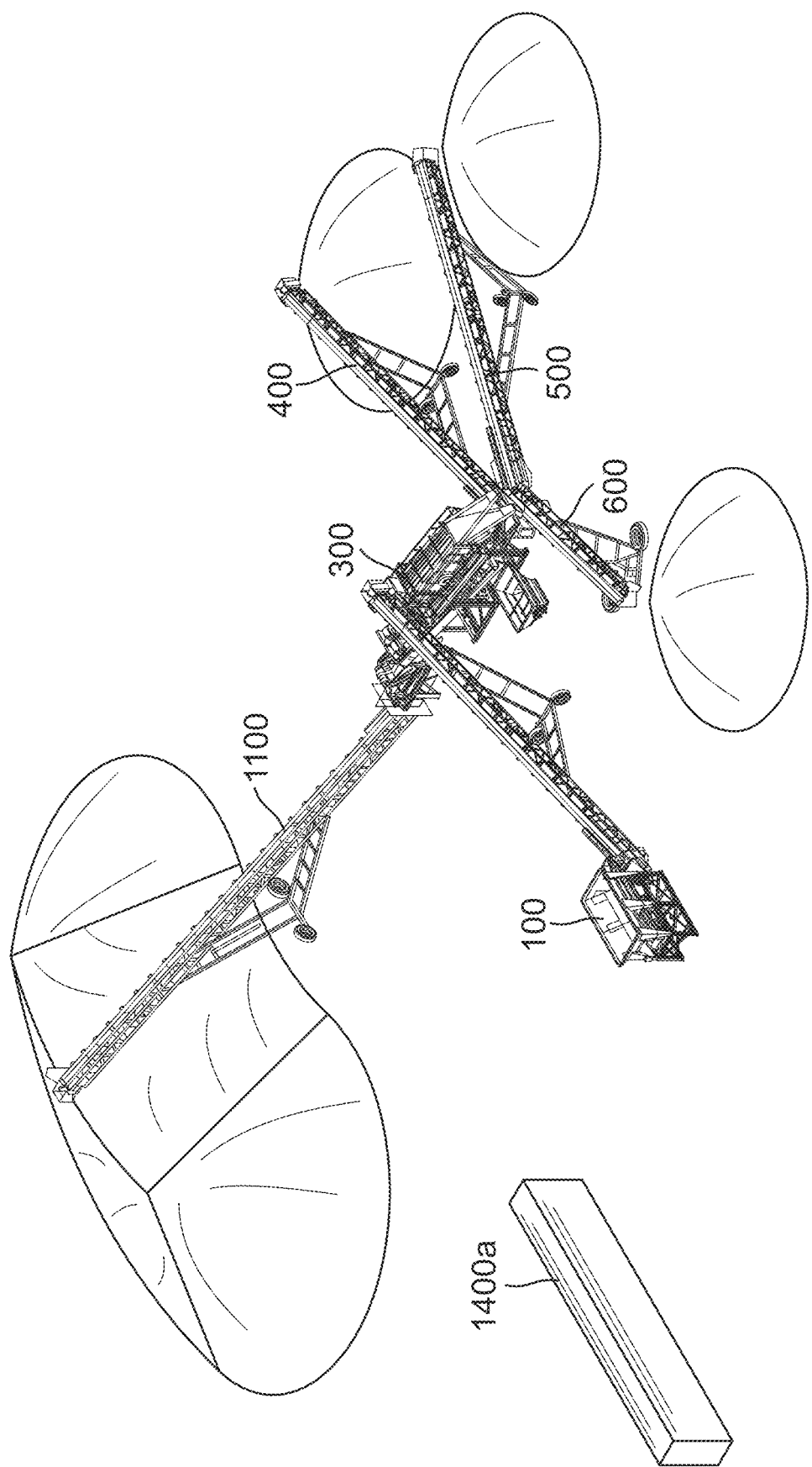
FIGS. 2-4 are top perspective views of the sorting station of FIG. 1.
Figure 3:
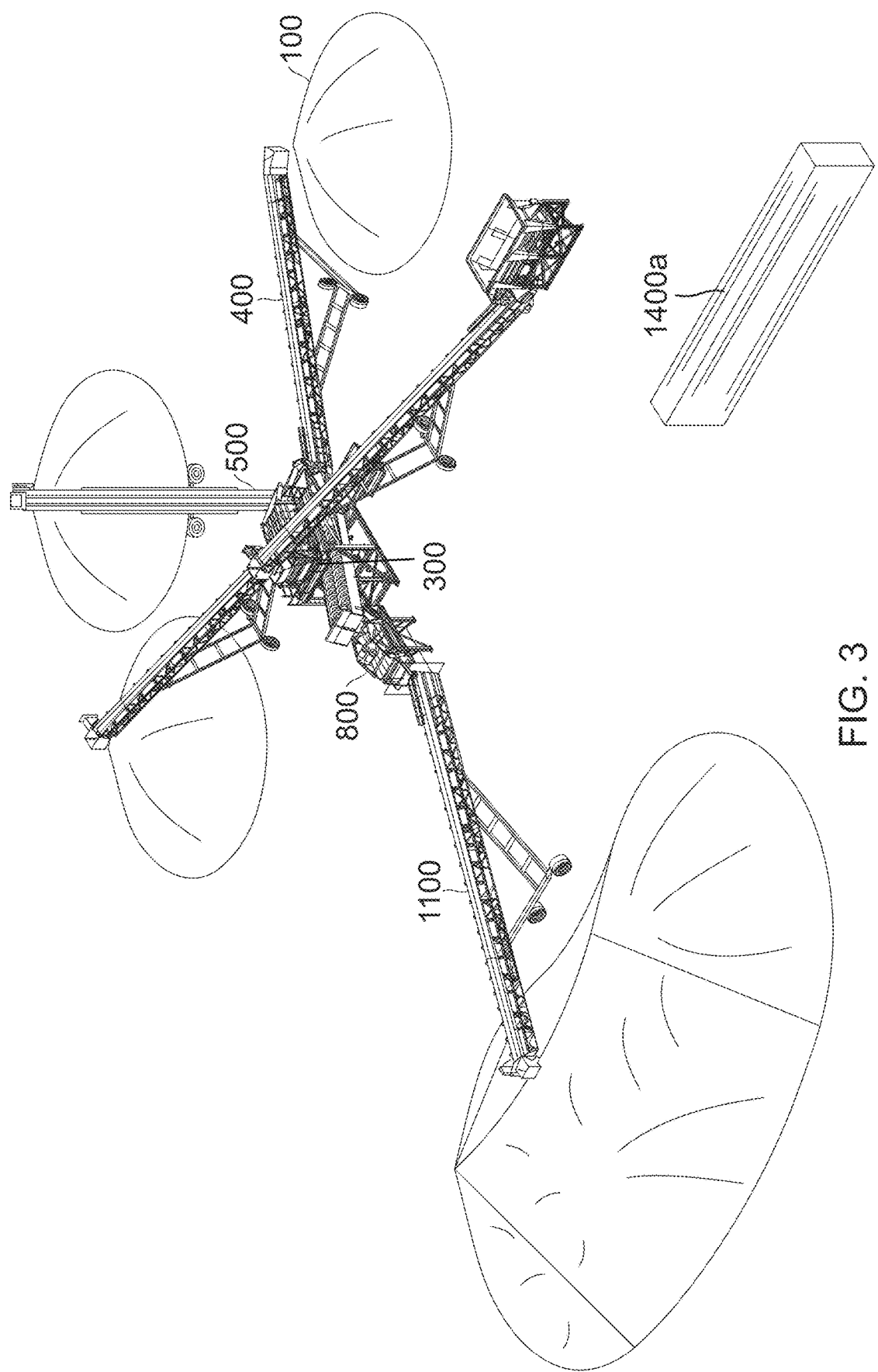

Detailed embodiments of the present system and method are disclosed herein. It is to be understood, however, that the disclosed embodiments are merely exemplary of the system and methods as a whole, which may be embodied in various and alternative forms. The figures are not necessarily to scale, and some figures may be configured to show the details of a particular component. Therefore, specific structural and functional details disclosed herein are not to be interpreted as limiting, but merely as a representative basis for the claims and for teaching one skilled in the art to practice the present invention.

As used herein, terminology will be defined as follows. The terminology "coarse fraction" is meant to refer to the fraction of the soil from which large debris, usually greater than 50 mm, has been removed and constituted of particles of a size within the functional range of the separator used to decontaminate the coarse fraction, namely, a jig. Jigs are recognized as being functional with particles larger than or about 170 µm with a plus or minus deviation of about 5 µm.

The terminology or word "soil" and the like (whether as a noun, adjective, etc.) shall be understood as referring to superficial earth crust, whether natural or man-made (i.e. unconsolidated mantle), namely, aggregate material. Other examples may be organic material containing loam, silty sand or common fill material.

The terminology or word "aggregate" and any similar word (whether as noun, adjective, etc.) shall be understood as referring to or as characterizing (or emphasizing) a "soil", "sediment", "material", etc. or any portion thereof as a mass of individual particles or components of the same or varied size (e.g. the size of the components may not be uniform and may range from microscopic granules to 10 cm with a plus or minus deviation of about 2 cm and larger than about 12 cm). It is also to be understood that the particle size distribution of any particular soil mass, etc. may be different from that of another soil mass, etc. Aggregate material may include dry matter, which may come from soil aggregate material from dry masses of land or dirt. For example, aggregate material may be material excavated from virgin earth, sedimentary aggregate including any bottom sediments of fresh or marine water systems. In another example, aggregate material may include an organic matter portion derived for example, from plant or animal sources. Organic material such as plant material would usually form part of the coarse aggregate material as described hereinafter and would include, for example, tree stumps, ligneous particles, etc. Aggregate material may also be derived from human activities like mining, for example, mineral aggregate materials.

The terminology "large debris" is meant to refer to material in the soil to be decontaminated that has a size equal or larger than about 6 cm with a plus or minus deviation of about 2 cm. It includes material such as rocks and large pieces of metals.

The terminology "intermediate fraction" is meant to refer to a fraction of the soil and having a particulate size that is smaller than that of the coarse fraction and that is within the functional range of the separator used to decontaminate the intermediate fraction, namely, a separator selected from the group consisting of a spiral and a fluidized bed classifier. Hence, the spiral and the fluidized bed classifier are recognized as being functional with particles within the size range of about 60 µm with a deviation of plus or minus about 5 µm and about 2000 µm with a deviation of plus or minus about 5 µm.

The terminology "fine fraction" is meant to refer to a fraction of the soil having a particulate size that is smaller than that of the intermediate fraction and that is within the functional range of the separator used to decontaminate the fine fraction, namely, a separator such as a multi-gravity separator ("MGS") and a flotation cell. Hence, the MGS and the flotation cells are recognized as being functional with particles within the size range of about 1 µm to about 300 µm, and about 10 µm to about 300 µm, respectively.

The terminology "classify", "classification" and the like shall be understood as referring to the dividing of an aggregate material into size groupings or portions and as including separation of constituent components in accordance with size, e.g. size separation by screening, gravity separation, etc.

Various embodiments of the presently disclosed sorting plant/station and methods of using the same will be described in detail with reference to the drawings wherein like references numerals identify similar or identical elements.

Referring now in detail to the drawing figures and in particular initially to FIGS. 1-10, a sorting station 10 is presented. Sorting station 10 may include a hopper 100, at least one conveyor belt 200, a deck screener 300, a fines collecting chute 700, a prep screw or sand screw 800, dewatering screen 1000, and other instruments known in the art for separating large debris, material with aggregate, intermediate and fine fractions, or matter of mixed materials. The sorting station 10 finds particular use in the preparation of useful soil of near theoretical top soil and in the removal of unwanted matter from silty sand or contaminated material. For example, utilizing a wet screening process with equipment commonly used in the mining industry, the organics and fine sediment (silt) can be separated from sand and gravel as shown in FIG. 1. The silty sand or contaminated material is disposed into a hopper 100, then travels on a conveyor belt 200 to a deck screener 300, and eventually reaching a stock pile. In embodiments, the travel time from the hopper 100 to the deck screener 300 may be of about 2 to 3 minutes.

The deck screener 300 is a device or frame that holds a screen cloth, membrane, or meshes in place, and can be configured to vibrate. Deck screener 300 is configured to filter matter via a wet screening process including solvent such as water. In selected embodiments, the deck screener can further include a screening drive (not shown). For example, schematic FIG. 1 shows a deck screener 300 including a feeding end 310 and a discharging end 320. While in use, a selected soil can travel from feeding end 310 to the discharging end 320.

Figure 4:
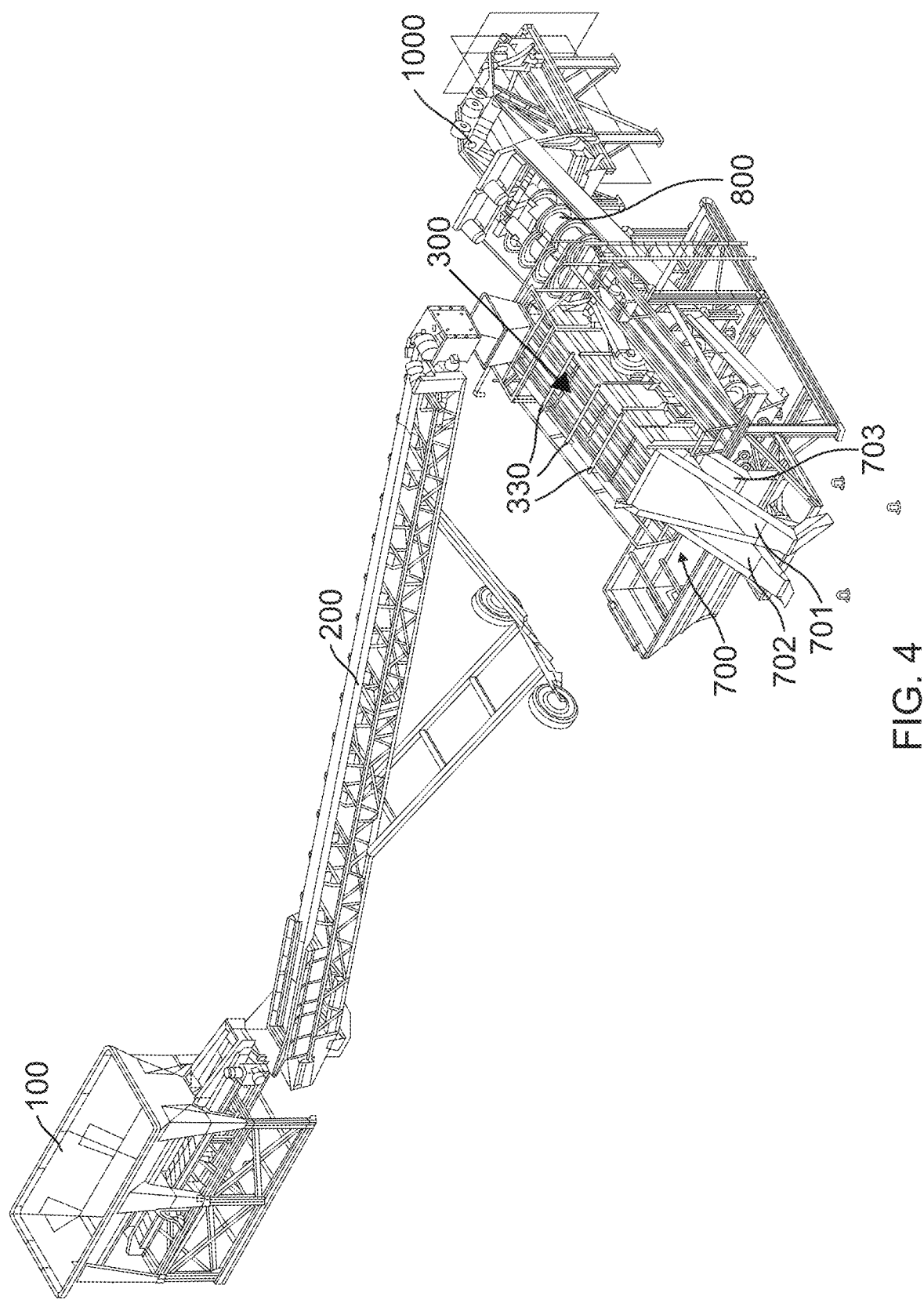
Figure 5:
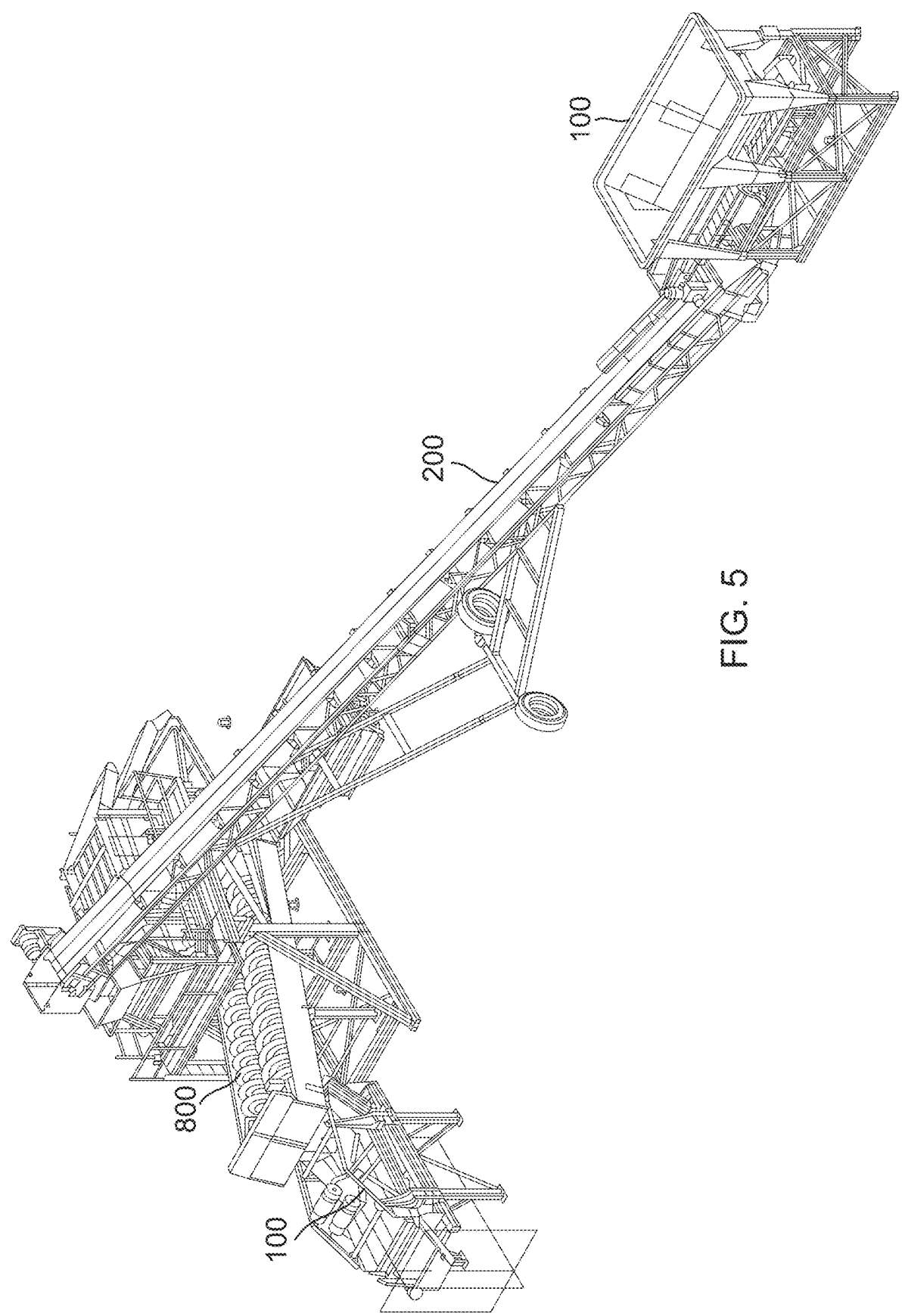
FIGS. 5-6 are top perspective views of selected portions of the sorting station of FIG. 1.

In embodiments, the deck screener 300 can be configured as a multiple deck. A multiple deck includes a plurality of screen decks placed in a selected configuration where there are a series of decks attached vertically and lean at the same angle. Multiple decks are often referred to as double deck, triple deck, or the like, and generally include element connected thereof. For example, deck screener 300 may include three screens made from at least one mesh material but not limited thereto, further including at least one spray bar 330 (FIG. 4). In embodiments, the at least one mesh material may be formed of metal such as cast iron, cooper, magnesium, manganese, silicon, stainless steel, copper, aluminum, iron, ore and the like; or polyurethane (PUR or PU), rubber such as a rubber sieve, a plastic material, or any other suitable polymer. In addition, it is understood that the three screens or at least one of the screens may be manufactured using any of the materials just mentioned, or others, or a combination thereof, i.e., a mesh may be manufactured using a metal like aluminum and may be further coated with PUR. In embodiments the deck screener 300 can be connected to a chute 700. The discharge chute 700 can be further configured to include a plurality of release chutes (release chute 701, release chute 702, and release chute 703).

In embodiments, the at least one spray bar 330 may be configured as a manifold, in other words the at least one spray bar 330 can be configured as a pipe or chamber branching into several openings. The at least one spray bar 330 can be configured to spray and distribute a selected fluid during the sorting process such as water or a flocculent. Further, the at least one spray bar 330 can assist washing-out, separating, or partially removing selected particles, which may be categorized as contaminants.

As mentioned above, in exemplary embodiments it may be desired to have deck screener 300 configured to include a plurality of screen decks. For example, as seen in FIG. 1 deck screener 300 may include a top deck 301, a deck 302, and a deck 303, each deck having a selected spacing configuration. The selected spacing configuration may be sized between 1 to 4 inches (about 25 mm to about 100 mm) for the top deck 301, between 1 inch to ½ of an inch (about 12 mm) for the middle deck 302, and between ½ inch or less (about 12 mm) for the bottom deck 303. It is to be understood that the selected spacing may vary depending on a desired size of the final products.

In embodiments, the average time which may take for a material to travel over the top deck 301 onto conveyor belt 400 is about 2 minutes. In embodiments, if the material falls through top deck 301 and onto middle deck 302, the average travel time is about 3 minutes. In embodiments, if the material falls through middle deck 302, and onto bottom deck 303, the total average travel time can be about 4 minutes. Accordingly, the total travel time through all three decks can be from about 2 to about 4 minutes, however the travel time may vary depending on a selected set up of sorting station 10.

In embodiments, at least one screen deck selected from decks 301-303 can be connected or disposed adjacent to a sand screw 800. Sand screw 800 and it may be configured to accept material either directly from aggregates screening operations or can be fed from a classification tank (not shown). The sand prep screw 800 can be adjustable and may be selected from a range of screws between 24 inches to about 72 inches in diameter, in embodiments the sand screw 800 can be equipped with an overflow weir at the feed point which may provide the mechanism for fines removal. For example, for a selected separation procedure, a sand prep screw 800 may be about 36 inches. While in use, a selected soil can be disposed on deck 300 where the selected soil may be filtrated through the top deck 302 and a second portion of the deck 300. The first portion of the top deck 302 may have a selected and a specific size screen on the deck (with a plurality of defined opening), which corresponds to the size fractions, i.e., coarse fraction, intermediate fraction, and/or fine fraction, which is preferred for passing over that screen, and passing through that screen. In embodiments, multiple water pipes, combined with multiple nozzles may be placed on each screen deck, to insure that all material is washed.

While in use, deck screener 300 can be configured to receive an element which may be a material, substance, or mixture therethrough, and it may further be configured to connect to additional elements. The received element can be separated or filtered at the deck screener 300 and the additional elements may be configured in such a way that may provide assistance with the separation or filtration. For example, a selected substance may go through first deck 301 of the deck screener 300. The selected substance may be silty sand which can be washed via an additional element like pressurized water at the rate of about 700 GPM to about 1200 GPM. An aggregate sample, which may be larger than other aggregate samples may travel down the top deck 301 to the discharge chute 701, onto a stacking conveyor belt 400, for example, an aggregate sample of about 1 inch in size and piled into a first stockpile 1110. In embodiments, most or all of the remaining fine silty sand material as well as aggregate samples less than about 1 inch in size, may fall to the middle deck 302 below. Once on the middle deck 302, the material which is smaller than about 1 inch, but larger than about 7/16 of an inch, will travel down the middle deck 302, being washed further by at least one spray bar 330 on the middle deck 302, to the discharge chute 702, onto a stacking conveyor belt 500, and piled into a second stockpile 1120, while having all fine silty sand material, as well aggregate samples less than about 7/16 of an inch in size, washed off along the way, falling to the bottom deck 303 below. In embodiments, on the bottom deck 303, the material larger than about 5/16 of an inch and smaller than about 7/16 inch will travel down the deck, being washed further by the at least one spray bar 330 on the bottom deck, to the discharge chute 703, onto a stacking conveyor belt 600, and piled into a third stockpile 1130, while having all fine silty sand material, which is less than about 5/16 of an inch fall into a fines collecting chute 700, which leads to the prep screw 800. A low end 810 of the angled sand screw 800 may be filled with water which may further wash the sand, and remove the remaining silt from the sand. As the sand travels toward an end opposed to low end 810 of the sand prep screw 800, the material is washed and scrubbed along the way, by the water in the fines collecting chute 700, in conjunction with the scrubbing action of the prep sand screw 800. By the time the sand travels approximately 25 feet up the prep sand screw 800 (non-limiting), the majority of the surface water will have drained off of the clean sand material. In embodiments, the travel processing time for the sand to be cleaned and scrubbed while traveling in the prep sand screw 800 may be from about 1 to about 2 minutes and the water may be at room or ambient temperature. The sand then may be dropped onto the dewatering screen 1000, which may be stationary, for further moisture removal for about 2 to about 3 minutes. All recaptured water during the process may be pumped back to the settler/classifier system, described below. A direct lift pump, displacement pump, gravity pump, or any other mechanical system able to displace/transport fluids may be used to circulate/re-direct the water within the system. After the sand is dropped onto the dewatering screen 1000, clean sand is dropped onto a final conveyor belt 1010 and stacked in a fourth stockpile 1100 in about 1 minute travel time. Water leaving the dewatering screen 1000, may be directed to a settling tank or retention pond 1400 by way of element 1300 (see FIG. 1) or may be re-fed into sorting station 10 by the way of processes which will be described below. For example, it may be desired to have settling tank or retention pond 1400 operably connected to the screen deck 300 via a fluid, such that the fluid circulates in a close loop cycle therefrom. The fluid may be circulated via known in the art elements like a pump, a hose or a pipe.

In embodiments, the total travel time of the material from hopper 100 to a final stockpile is about 7 minutes to about 10 minutes.

In embodiments, sorting station 10 may define a mechanical process where water is captured and re-used through an on-site storage tank 1400a or settler/classifier system 1400a. To facilitate rapid settlement of suspended fine sediments (fines) in water within the settler/classifier system 1400a, a flocculent polymer may be introduced in solution form into the initial chamber (not shown) of the settler/classifier system 330a. Once settled, the fines may progress within the settler/classifier 1400a via a paddle conveyor (not shown) system and exit the system through downstream weir. The clarified water may be pumped back into the deck screener 300; therefore, no waste is generated during the sorting process.

Figure 6:
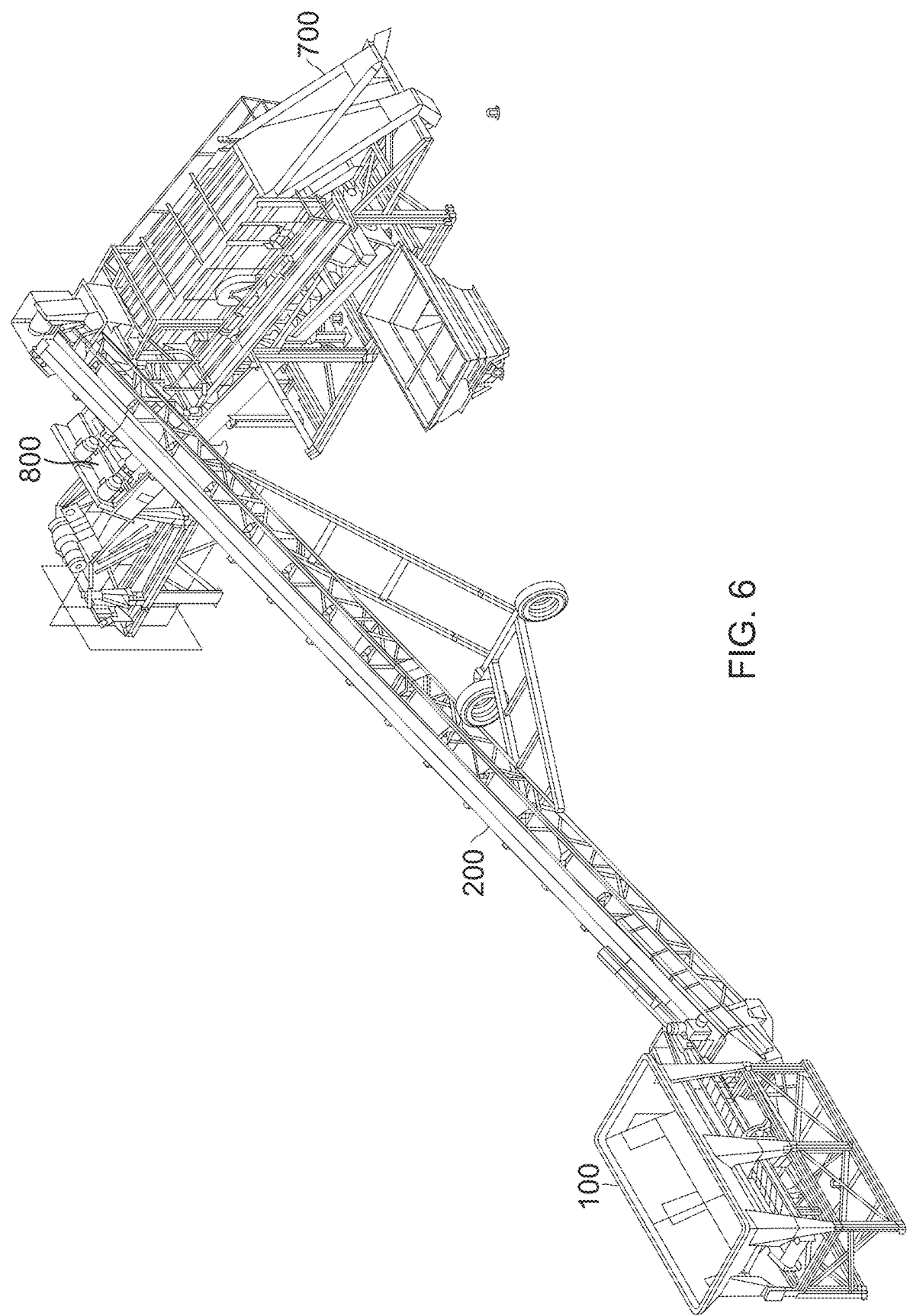

With reference to FIGS. 4 and 6, in embodiments, the sorting station 10 may be a commercially available system, for example, a Kolberg Pioneer 1822SH Skid Plant having a triple deck horizontal screener 300 with spray bars 330 on each of the three decks, each deck having a discharge chute 701-703 (which may have various types of abrasion resistant (AR) liners) and one screen fines collecting hopper (which may have various types of AR liners), which has a Kolberg Pioneer Series 5036-25T (about 36 inch diameter long×25 feet long) sand prep screw with solid flite spirals, Ni-hard outer wear shoes, shaft mount reducers, variable frequency drive, and is configured to be rated for about 100 TPH (tons per hour) to about 175 TPH (tons per hour) of sand material. In embodiments, when an impact point on a hopper, or chute is hit constantly with material, an abrasion resistant liner or AR wear plate may be bolted over the location of the constant impact, so the hopper does not wear down, but only the above mentioned AR wear plate or liner. Further, if the wear plate wears out, a user may replace it with a new one. The sorting station 10 may include a vibration system 304 in order to assist with the screening of matter. More specifically, a vibration via a shaker (not shown) may be applied to deck screener 300 while matter is transported from hopper 100 to deck screener 300 to avoid clogging or to speed up the screening process. In a different embodiment, the vibration may be provided by any device known in the art that which configured to induce a vibration and it can be operably connected to either side of the deck screener 300 or on both sides. In embodiments, the vibration device or shaker may include mechanical shakers, electro mechanical shakers, shakeout machines, vibratory conveyors, or any other industrial vibratory equipment.

Figure 7:
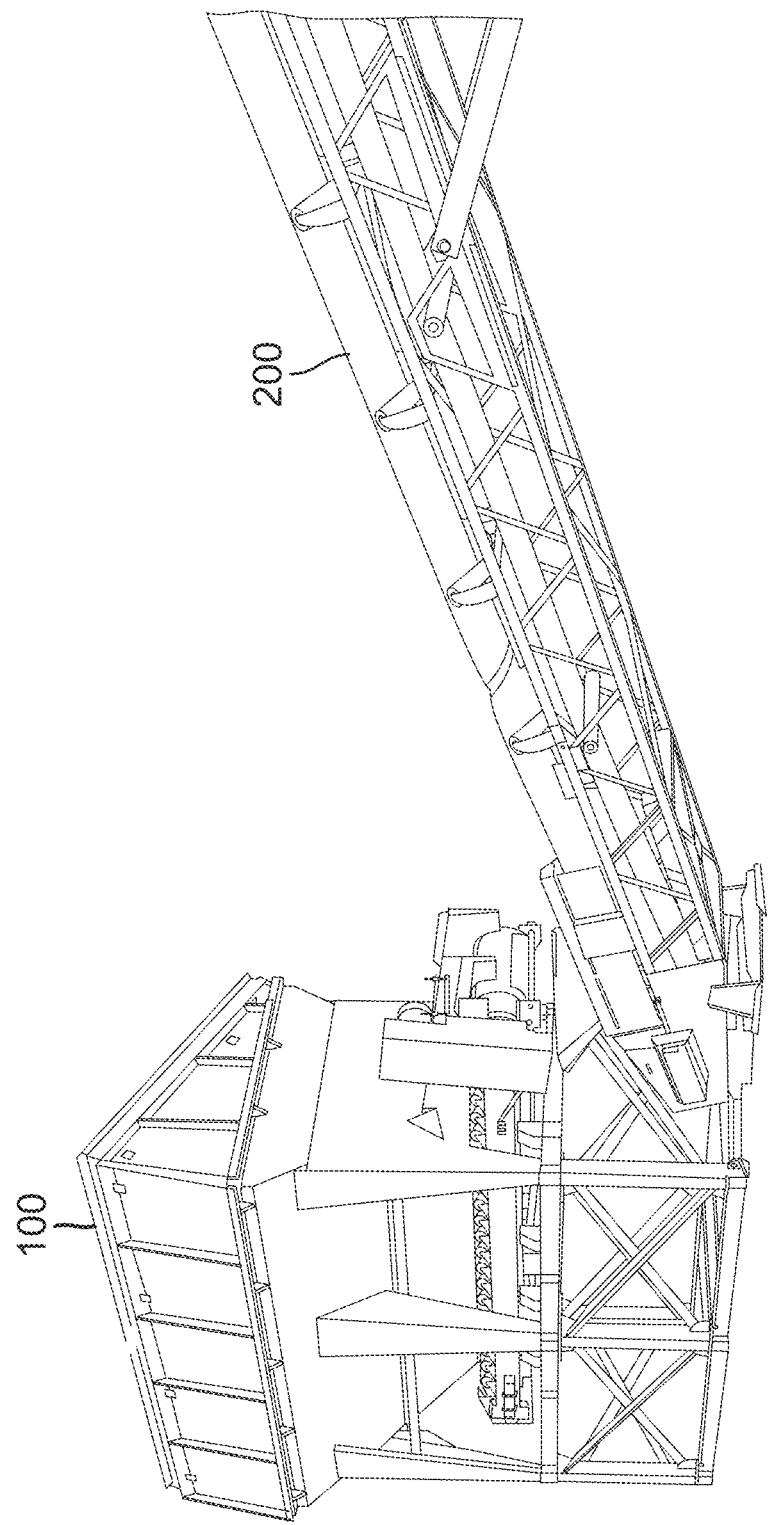
FIGS. 7-10 are enlarged side views of selected portions of the sorting station of FIG. 1.

With reference to FIG. 7, in embodiments, hopper 100 may have a substantially rectangular cross-sectional shape configuration with an opening configured to receive matter thereof. Hopper 100 which feeds onto conveyor belt 200, may be constructed of a strong and durable material such as, for example, steel or aluminum. Hopper 100 may include steel walls with additional steel plates to prevent wear and add strength and durability. In embodiments, the additional plates may be removably attached to hopper 100. In addition, hopper 100 may be configured to resist wear and tear caused by dropping matter therein. In embodiments, hopper 100 may be a commercially available hopper such as Kolberg Pioneer Series 930-18-20 Skid Mounted Hopper/Feeder with a 20 cubic yard hopper, variable frequency drive, grizzly dump for scalping of material greater than 6 inches and at a rated for about 400 TPH to about 600 TPH of material.

Figure 8:
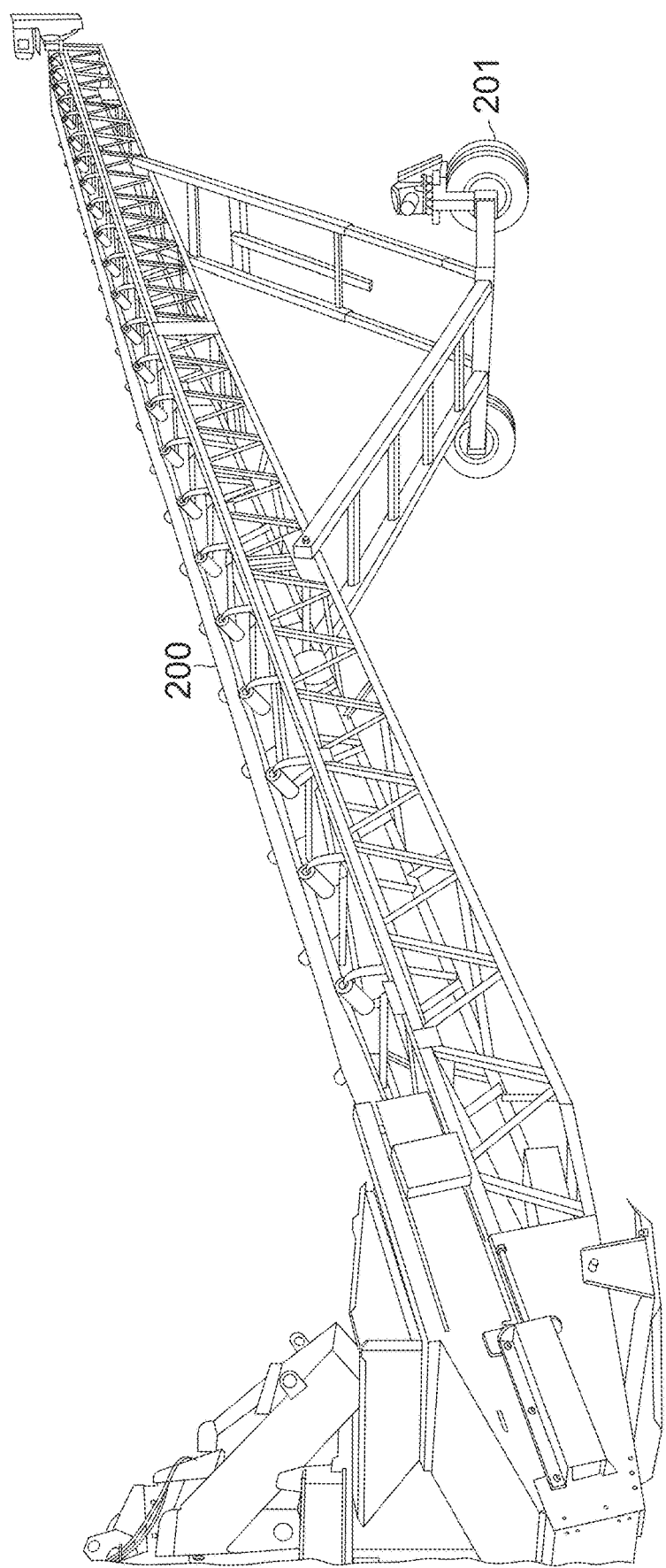
Figure 9:
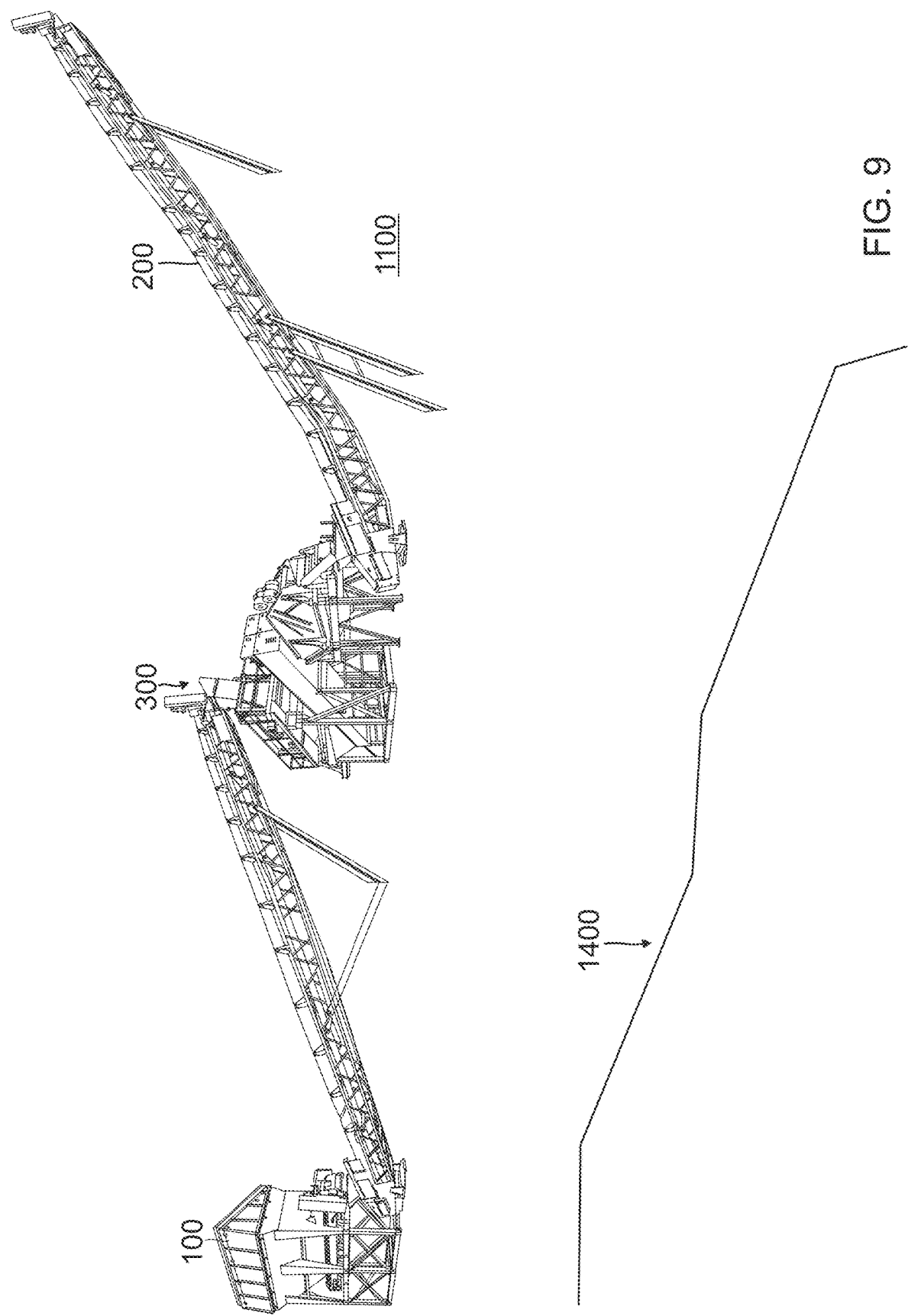
Figure 10:
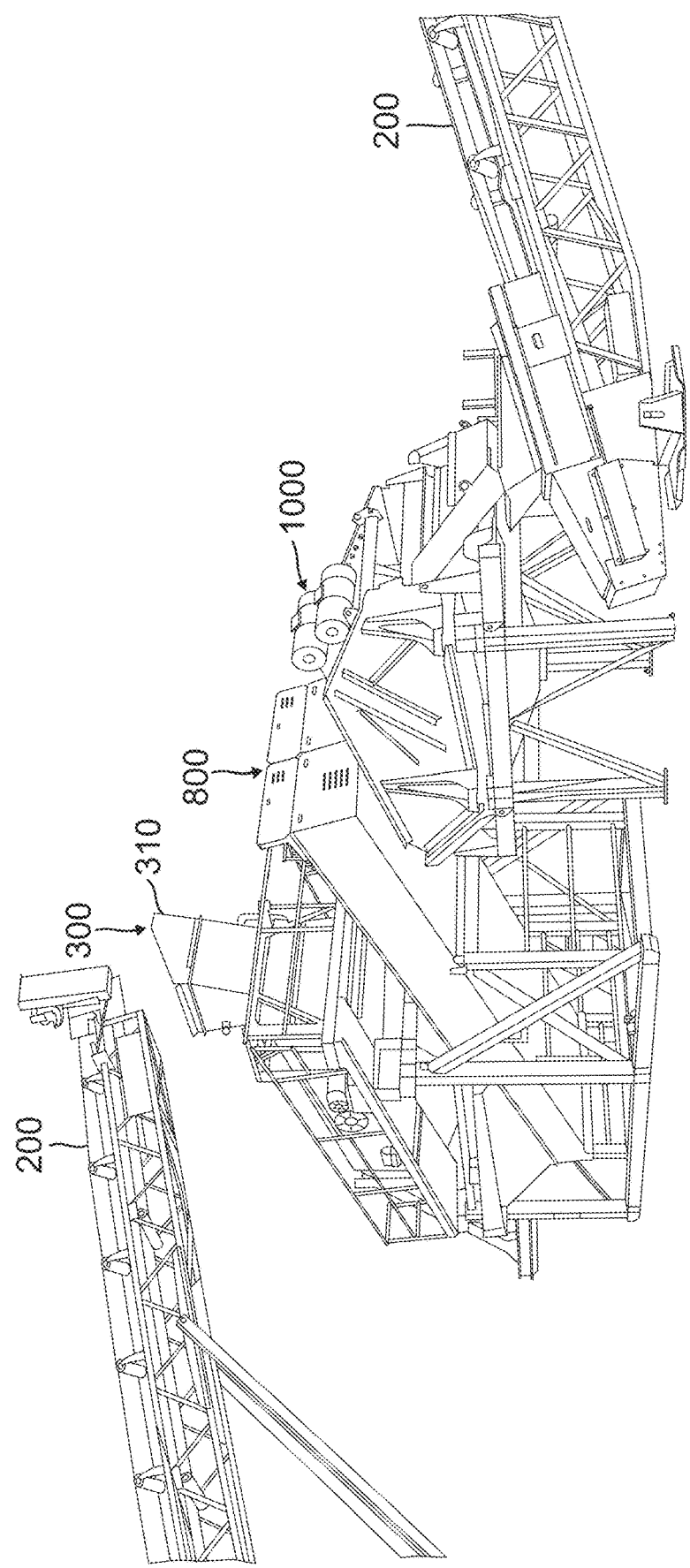

With reference to FIGS. 8-10, it may be desired to have a conveyor belt with a movable configuration. For example, in embodiments, conveyor belt 200 may include a set of wheels 201 which may enable a user to move or deploy conveyor belt 200 in a different location. Further, a user may set conveyor belt 200 to a selected elevation, thus, conveyor belt 200 may include mechanical means to set and maintain a selected height with respect to a surface where sorting station 10 is being used. It must be contemplated that in embodiments a different configuration for sorting station 10 may be desired, thus, a movable configuration may also be applied to any of the above mentioned conveyor belts or elements of sorting station 10.

In embodiments, after the sorting process, a selected matter from the sorting of matters may be ready for commerce. For example, one or all of the matters being transported by conveyor belts 400, 500, 600, and 1010 may be ready for purchase by any individual and further used and/or recycled in construction projects, civil projects, residential, commercial, industrial or the like. For example, a coarse fraction may be formed by using the above described sorting process using sorting station 10. Once ready for commerce, the coarse matter could be used for manufacturing of asphalt, concrete, pipe bedding, concrete foundation base material, concrete floor base material, sluiceway material, and landscape decretive material, among many other uses for coarse and intermediate fraction material. In another example, a fine material having a preferred size from about 0.75 μm to about 6.3 mm may be provided in the sorting process. This finer material can be used for the manufacturing of asphalt and concrete, as well as structural fill, engineered fill, thermal mitigation sand, environmental reclamation material, environmental remediation material, embankment fill, and a clean sub-base material, and the like.

Figure 11:
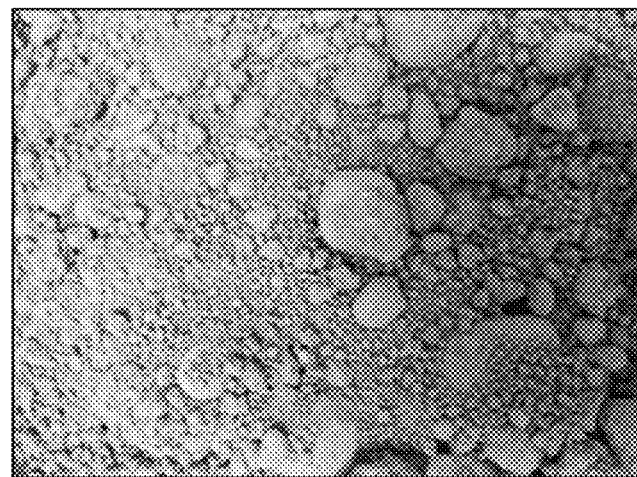
FIGS. 11-13 are perspective views of matter samples in accordance with the present disclosure.
Figure 12:
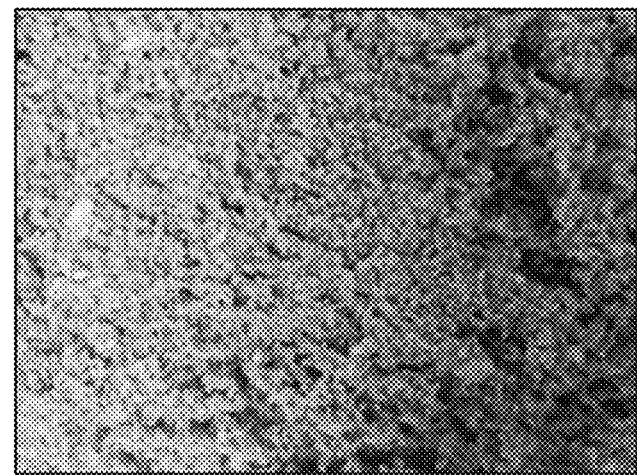
Figure 13:
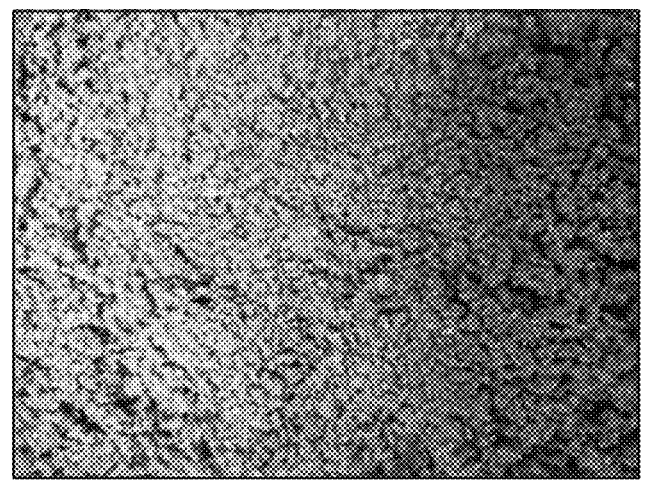

With reference to FIGS. 11-13, sorting station 10 can be configured to filter soil, dirt, sand, or the like, and ultimately obtain a plurality of matters having a selected texture or grain size. Exemplary embodiments in FIGS. 12 and 13 depict texture and grain samples which can be obtained via filtering a sample thought the sorting station 10. More specifically, a sample 20 (FIG. 11) can be used to obtain a sample 30 (FIG. 12) and a sample 40 (13). In embodiments, a sample 20 can be soil, organic containing loam, common fill material or silty sand, can be washed/sorted via sorting station 10 and ultimately obtaining a substantially similar sample like samples 30 or 40. The texture or grain size of the samples may be tested before and after the sorting process as to comply with local matter codes.

For example, FIGS. 14-16 depict exemplary embodiments of tables encompassing testing data associated with pre and post sorting processes of matter. More specifically, FIGS. 14a-14f depict a table (table 1) including data associated with a sample of silty sand before the sorting process, and FIGS. 15a-16f depict tables (tables 2 and 3) including data associated with a sample of matter after the sorting process of silty sand. The data before the sorting and the data after the sorting data are empirical data that can be compared to comply with local environmental codes. Additionally, this data may be used to adjust sorting station 10 to a desired sorting configuration.

It should be emphasized that the above-described embodiments are merely examples of possible implementations. Many variations and arrangements may be made to the above-described embodiments, which may include different arrangements of the sorting station described above including in the washing, filtering, transporting, and in the general process used when sorting a matter. All such modifications and variations are intended to be included herein within the scope of this disclosure and protected by the following claims.

What is claimed is:

1. A sorting station comprising;
   a conveyor for receiving matter;
   a deck screener including at least one filter filtering the matter and a fluid source supplying a fluid including a flocculant and anti-foam agent to be added at a location of the sorting station;
   a chute in fluid communication with the deck screener and discharging aggregates of the fluid and the filtered matter;
   a drying station in fluid communication with the chute and dewatering the aggregates; and
   a settler in fluid communication with the drying station and the chute and settling the dewatered aggregates,
   wherein the fluid is configured to wash the matter disposed onto the deck screener.

2. The sorting station of claim 1, wherein the matter is a byproduct of a construction or excavation site.

3. The sorting station of claim 2, wherein the byproduct includes or is at least one matter selected from recognizable uncontaminated concrete asphalt, rock, bricks, soil, and mixtures thereof.

4. The sorting station of claim 1, wherein the location is selected from the deck screener, chute, settler or a combination thereof.

5. The sorting station of claim 1, wherein the flocculent or the antifoam are in a liquid or solid phase.

6. The sorting station of claim 1, further comprising:
   a fluid path receiving fluid from the drying station and the at least one settler where the anti-foam agent is added; and
   a fluid receiving area in fluid communication with the fluid path.

7. A method for sorting matter comprising:
   selecting a fluid path;
   receiving matter via a conveyor operably connected to a plurality of screeners;
   passing the matter through the plurality of screeners in fluid communication with the conveyor to obtain byproducts;
   depositing at least one of the byproducts into a pond in fluid communication with the plurality of screeners;
   adding a flocculant at a location of the fluid path; and
   adding an anti-foam agent at the location of the fluid path.

8. The method for sorting matter of claim 7, further including moving the anti-foam agent by mechanical action.

9. The method for sorting matter of claim 7, further including pumping the anti-foam agent via a metering pump.

10. The method for sorting matter of claim 7, further comprising selecting a flow rate between 800-1000 GPM.

* * * * *